(12) United States Patent
Kwon et al.

(10) Patent No.: US 11,075,496 B2
(45) Date of Patent: Jul. 27, 2021

(54) LASER DICING DEVICE, METHOD OF LASER BEAM MODULATION, AND METHOD OF DICING A SUBSTRATE

(71) Applicant: Samsung Electronics Co., Ltd., Suwon-si (KR)

(72) Inventors: Young-chul Kwon, Asan-si (KR); Dong-woo Kang, Seoul (KR); Man-hee Han, Cheonan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 16/354,686

(22) Filed: Mar. 15, 2019

(65) Prior Publication Data

US 2020/0006909 A1 Jan. 2, 2020

(30) Foreign Application Priority Data

Jun. 28, 2018 (KR) .................. 10-2018-0074892
Feb. 22, 2019 (KR) .................. 10-2019-0021292

(51) Int. Cl.
*H01S 3/00* (2006.01)
*G02B 27/09* (2006.01)
*G02B 5/30* (2006.01)
*G02B 27/28* (2006.01)

(52) U.S. Cl.
CPC .......... *H01S 3/0085* (2013.01); *G02B 5/3083* (2013.01); *G02B 27/0927* (2013.01); *G02B 27/286* (2013.01)

(58) Field of Classification Search
CPC ........ G02B 5/30; G02B 5/3083; G02B 27/09; G02B 27/0927; G02B 27/28; G02B 27/286; G02B 17/08; G02B 3/04; H01S 3/00; H01S 3/0085; H01S 5/022
USPC ........ 359/718, 719, 238, 647, 820; 438/461, 438/463, 795; 372/26, 29.014; 219/121.6, 121.61, 121.71, 121.75
See application file for complete search history.

(56) References Cited

U.S. PATENT DOCUMENTS 8,642,918 B2 * 2/2014 Unrath ............... B23K 26/0613
219/121.61
8,852,698 B2 10/2014 Fukumitsu
9,212,081 B2 12/2015 Peng et al.
(Continued)

FOREIGN PATENT DOCUMENTS

JP 3210934 B2 9/2001
JP WO2006-038565 A1 4/2006
(Continued)

*Primary Examiner* — Jie Lei
(74) *Attorney, Agent, or Firm* — Muir Patent Law, PLLC

(57) ABSTRACT

A laser dicing device includes: a Gaussian laser beam emitter configured to emit a Gaussian laser beam having a Gaussian energy distribution; a laser beam modulator configured to modulate a shape of the emitted Gaussian laser beam by reducing intensity in a region surrounding a first line parallel with a laser dicing direction of the emitted Gaussian beam, the first line crossing a center of the Gaussian laser beam in a plan view; a focusing lens configured to focus a modulated Gaussian laser beam modulated by the laser beam modulator; and a substrate support configured that a substrate to be diced is seated on the support, wherein the focusing lens is configured to collect the modulated Gaussian laser beam inside the substrate seated on the substrate support.

9 Claims, 30 Drawing Sheets

(56) References Cited

U.S. PATENT DOCUMENTS

| | | | |
|---|---|---|---|
| 2006/0256335 A1* | 11/2006 | Chen | G02B 27/0905 356/369 |
| 2007/0115551 A1* | 5/2007 | Spilman | G03F 7/70566 359/489.07 |
| 2008/0061043 A1 | 3/2008 | Fuji | |
| 2016/0052085 A1 | 2/2016 | Kawaguchi et al. | |
| 2017/0216973 A1 | 8/2017 | Sakamoto et al. | |
| 2018/0068897 A1 | 3/2018 | Fukuyo et al. | |

FOREIGN PATENT DOCUMENTS

| | | |
|---|---|---|
| JP | 4390937 B2 | 12/2009 |
| JP | 5770436 B2 | 8/2015 |
| KR | 10-0497005 B1 | 6/2005 |
| KR | 10-1271104 B1 | 6/2013 |
| KR | 10-1339637 B1 | 12/2013 |

* cited by examiner

LASER DICING DEVICE, METHOD OF LASER BEAM MODULATION, AND METHOD OF DICING A SUBSTRATE

CROSS-REFERENCE TO RELATED APPLICATION

This application claims priority under 35 USC § 119 to Korean Patent Application Nos. 10-2018-0074892 and 10-2019-0021292 respectfully filed on Jun. 28, 2018 and Feb. 22, 2019 in the Korean Intellectual Property Office, the disclosures of which are incorporated herein in their entirety by reference.

BACKGROUND

The present disclosure relates to a laser dicing device, e.g., to a laser dicing device suppressing scattering of a laser beam in a substrate and preventing optical damage to a semiconductor device formed on the substrate. The present disclosure is also related to a method of manufacturing a semiconductor device using the laser dicing device.

In general, to dice a substrate on which a semiconductor device, an electronic part, etc. are formed into individual chips, a dicing device which dices the substrate by inserting a thin dicing blade including fine diamond grains into a grinding groove of the substrate has been used. In the case of dicing a substrate by a general dicing blade, chipping may occur on a front surface or a rear surface of the substrate, and the chipping has become one of the factors that deteriorate the performance of diced chips.

Due to such a problem, instead of a general dicing blade, a laser dicing device which irradiates a substrate with a laser beam having a beam-focusing point inside the substrate and dices the substrate into individual chips by forming a modified region and a crack caused by multi-photon absorption is proposed.

SUMMARY

Aspects of the inventive concept provide a method of modulating a laser beam, whereby the laser beam focused inside a substrate does not spatially overlap a modified region and a crack which are pre-formed in the substrate, and thus, scattering of the laser beam incident on the substrate is prevented or reduced.

Aspects of the inventive concept also provide a laser dicing device, whereby a laser beam focused inside a substrate does not spatially overlap a modified region and a crack which are pre-formed in the substrate, and thus, scattering of the laser beam incident on the substrate is prevented or reduced.

Aspects of the inventive concept also provide a method of dicing a substrate, whereby a laser beam focused inside the substrate does not spatially overlap a modified region and a crack which are pre-formed in the substrate, and thus, scattering of the laser beam incident on the substrate is prevented or reduced.

According to an aspect of the inventive concept, there is provided a method of laser beam modulation, the method including: emitting a Gaussian laser beam; and modulating a shape of the emitted Gaussian laser beam by reducing intensity of the Gaussian laser beam in a region surrounding a first line passing through a center of the Gaussian laser beam in a plan view, wherein the first line is parallel with a laser dicing direction of the emitted Gaussian laser beam.

According to another aspect of the inventive concept, there is provided a laser dicing device including: a Gaussian laser beam emitter configured to emit a Gaussian laser beam having a Gaussian energy distribution; a laser beam modulator configured to modulate a shape of the emitted Gaussian laser beam by reducing intensity in a region surrounding a first line parallel with a laser dicing direction of the emitted Gaussian laser beam, the first line crossing a center of the Gaussian laser beam in a plan view; a focusing lens configured to focus a modulated Gaussian laser beam modulated by the laser beam modulator; and a substrate support configured that a substrate to be diced is seated on the substrate support, wherein the focusing lens is configured to collect the modulated Gaussian laser beam inside the substrate seated on the substrate support.

According to another aspect of the inventive concept, there is provided a method of dicing a substrate by using a laser dicing device, the method including: emitting a Gaussian laser beam; modulating a shape of the emitted Gaussian laser beam by reducing intensity in a region surrounding a first line parallel with a laser dicing direction of the emitted Gaussian laser beam, the first line passing through a center of the Gaussian laser beam in a plan view; focusing the modulated Gaussian laser beam; forming modified regions and cracks by collecting the focused modulated Gaussian laser beam inside a substrate; relatively moving the laser dicing device and the substrate in a dicing direction; and dicing the substrate into individual semiconductor chips by applying an external force to the substrate and expanding the cracks.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1A:
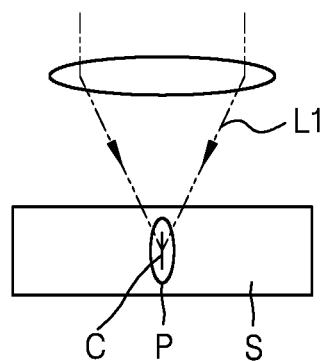
FIGS. 1A through 1C are conceptual diagrams for explaining how a laser beam emitted from a laser dicing device is collected in the vicinity of a beam-focusing point in a substrate and forms a modified region and a crack.

FIG. 1A is a cross-sectional view of a substrate S and a lens focusing a laser beam L1 for explaining how the laser beam L1 emitted from a laser dicing device is collected in the vicinity of a beam-focusing point in the substrate S and forms a modified region P and a crack C.

Referring to FIG. 1A, the laser beam L1 of the laser dicing device transmitted through a surface of the substrate S may concentrate energy thereof in the vicinity of the beam-focusing point. The laser beam L1 focused in the vicinity of the beam-focusing point inside the substrate S may form the modified region P and the crack C. For example, the modified region P may be a region having a different structure from its vicinity structure. For example, when the substrate is a crystalline semiconductor substrate, the modified region P may include a polycrystalline semiconductor structure. For example, the modified region P may include the crack C within the modified region P. In certain embodiments, the modified region P may have a substantially the same structure as modified regions in its vicinity except for the crack C.

The laser dicing device may be a stealth dicing (SD) laser device. The SD laser device may focus a laser dicing beam having a wavelength capable of transmitting through the substrate S by using a lens and collect the laser dicing beam at a point inside the substrate S. The collected laser dicing beam may include short pulses oscillating at a high repetition rate and may be highly condensed to a certain level of diffraction. The laser dicing beam in the substrate S may be condensed at a very high peak power density in the vicinity of the beam-focusing point, and at the same time, may be spatially condensed. For example, the laser dicing beam may be condensed to a level of critical focus at a point within the substrate S. When the peak power density is exceeded in a process of focusing the laser dicing beam penetrating through the substrate, an extremely high nonlinear multi-photon absorption phenomenon may occur in the vicinity of the beam-focusing point. Due to the highly nonlinear multi-photon absorption phenomenon occurring in the vicinity of the beam-focusing point, crystals of the substrate S may absorb energy of the laser dicing beam condensed in the substrate S and cause a heat melting phenomenon to form the modified region P and the crack C. For example, the laser dicing beam may melt a portion of the substrate S to form the modified region P including the crack C. By using the SD laser device, only local points in the substrate may be selectively processed without damaging the front and rear surfaces of the substrate. In certain embodiments, the laser dicing device may include a mechanism for changing relative positions of the laser beam and the substrate to dice the substrate at a high speed according to a dicing pattern.

Figure 1B:
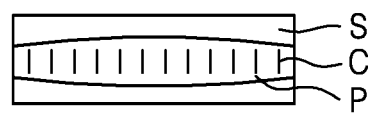

FIG. 1B is a cross-sectional view of the substrate S that shows a state in which the laser dicing device relatively moves with respect to the substrate S in a dicing direction after forming one modified region P and one crack C in a portion of the substrate S and forms a plurality of modified regions P and a plurality of cracks C in sequence. Due to forming the plurality of modified regions P and cracks C, a balance in inter-molecular forces of the substrate S may be broken, and when an external force is applied to the substrate S, the substrate S may be easily divided along the plurality of modified regions P and cracks C.

Figure 1C:
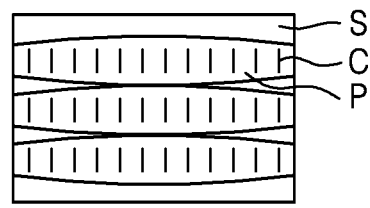

FIG. 1C is a cross-sectional view of the substrate S that shows a state in which the plurality of modified region P and crack C are formed in multiple layers in the substrate S. The plurality of modified regions P and cracks C may be formed at various heights in the substrate S by adjusting positions of the beam-focusing points of the laser beam L1. Due to the plurality of modified regions P and cracks C at the various heights, the flexibility of a dicing process of the substrate S may be increased.

Figure 2A:
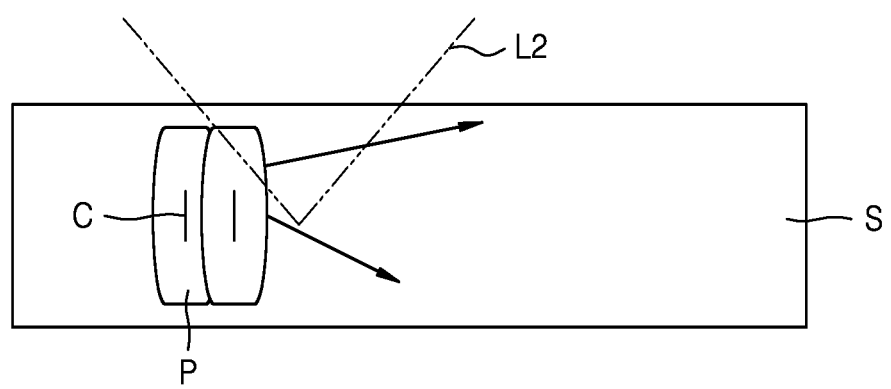
FIGS. 2A and 2B are conceptual diagrams for explaining how a laser beam emitted from a conventional laser dicing device is collected in the vicinity of a beam-focusing point in a substrate and forms a modified region and a crack.
Figure 2B:
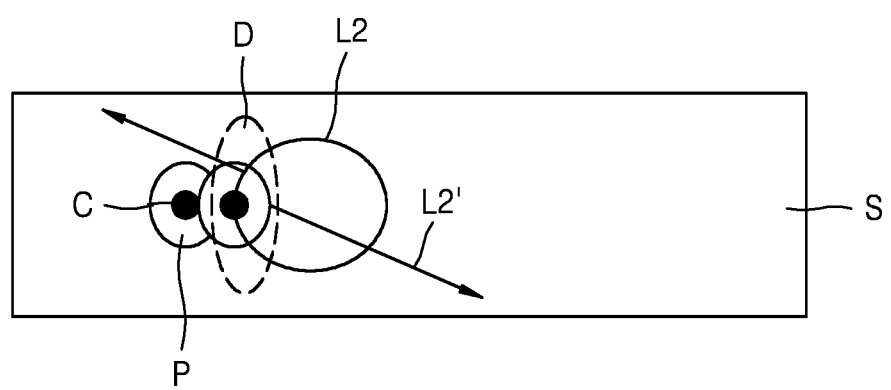

FIGS. 2A and 2B are diagrams for explaining how a laser beam L2 emitted from a conventional laser dicing device is collected to form the modified region P and the crack C in the substrate. FIG. 2A is a cross-sectional view of the substrate S for explaining how the conventional laser beam L2 is collected in the vicinity of the beam-focusing point in the substrate S and forms the modified region P and the crack C. FIG. 2B is a plan view of the substrate S for explaining how the conventional laser beam L2 is collected in the vicinity of the beam-focusing point in the substrate S and forms the modified region P and the crack C.

Referring to FIGS. 2A and 2B, a spatial overlap D may occur between the laser beam L2 emitted from the conventional laser dicing device and the modified region P and/or the crack C that are pre-formed. Due to the spatial overlap D, a portion of the laser beam L2 incident into the substrate S may be scattered in the substrate S, and a scattered beam L2' may cause optical damage to semiconductor elements formed in the substrate S. When the conventional laser dicing device irradiates the laser beam L2 closely incident to improve a dicing power of the substrate S, the spatial overlap D between the laser beam L2 and the preformed modified region P and/or crack C may increase and there may be a risk of increasing damage to the substrate S due to scattering of the laser beam L2. The above-described problems of the conventional laser dicing device may be solved by embodiments of the inventive concept to be described below.

Figure 3A:
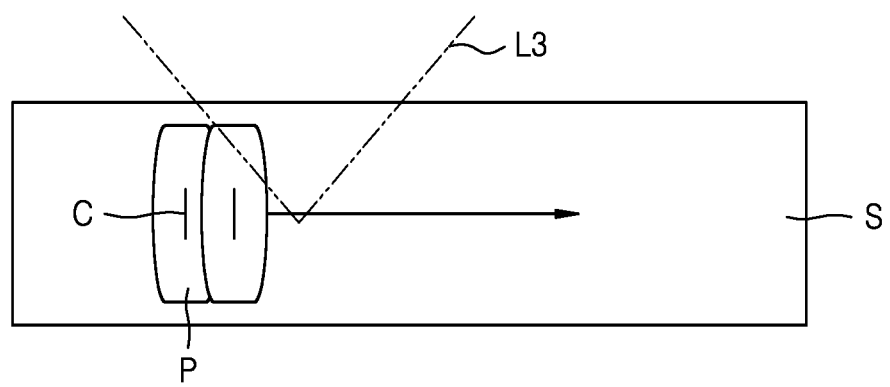
FIGS. 3A and 3B are conceptual diagrams for explaining how a laser beam emitted from a laser dicing device according to an embodiment of the inventive concept is collected in the vicinity of the beam-focusing point in a substrate and forms a modified region and a crack.
Figure 3B:
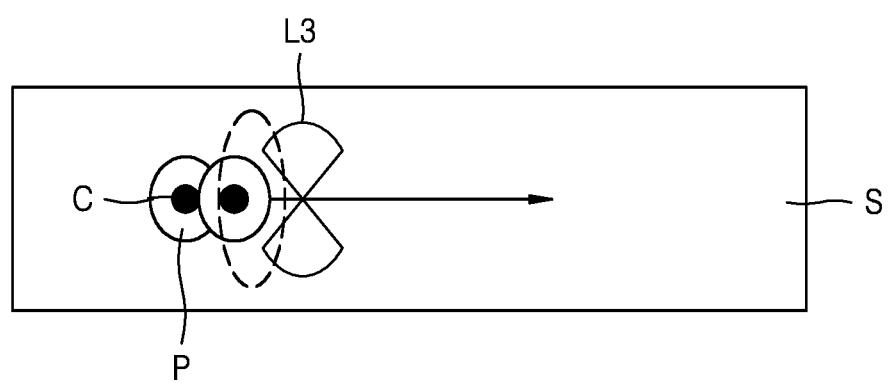

FIGS. 3A and 3B are diagrams for explaining how a laser beam L3 emitted from a laser dicing device according to an embodiment of the inventive concept forms the modified region P and the crack C in the substrate S. FIG. 3A is a cross-sectional view of the substrate for explaining how the laser beam L3 for dicing according to an embodiment of the inventive concept is collected in the vicinity of the beam-focusing point in the substrate S and forms the modified region P and the crack C. FIG. 3B is a plan view of the substrate S according to this embodiment of the inventive concept.

Referring to FIGS. 3A and 3B, unlike the conventional laser dicing device, the laser beam L3 emitted from the laser dicing device and incident on the substrate S may have a shape in which there is no beam in the vicinity of a direction parallel with the laser dicing direction. Here and throughout the present disclosure, the description that there is no beam or weak/low intensity beam in the vicinity of a direction parallel with the laser dicing direction may refer to a state where there is no beam or weak/low intensity beam in the vicinity of and along a line parallel with the laser dicing direction and passing through a center of the laser beam in a plan view. For example, the vicinity of the line may be an area surrounding the line. Substantially, there may be no beam in the vicinity of the direction parallel with the laser dicing direction. However, the invention is not limited thereto. For example, the laser beam L3 may have a relatively lower intensity in the vicinity of the first line than in the vicinity of a direction perpendicular to the laser dicing direction in a plan view. Here and throughout the present disclosure, a direction perpendicular to the laser dicing direction may refer to and correspond to a second line passing through the center of the laser beam in a plan view and perpendicular to the laser dicing direction.

According to an embodiment, the laser beam L3 incident on the substrate S may have, in a plan view, an 8-shaped form in which there is no beam in the vicinity of the direction parallel with the laser dicing direction. Due to the 8-shaped form in which there is no beam of the laser beam L3 in the vicinity of the direction parallel with the laser dicing direction, the spatial overlap D between the preformed modified region P and the crack C and the laser beam L3 may be prevented or reduced. Thus, the scattering of the laser beam L3 may be prevented or reduced, and the semiconductor elements formed on the substrate S may not be damaged.

Hereinafter, a method of reducing intensity of the laser beam L3 in the vicinity of the direction parallel with the laser dicing direction, for example, a method of modulating the laser beam L3 into an 8-shaped laser beam is described in more detail.

Figure 4A:
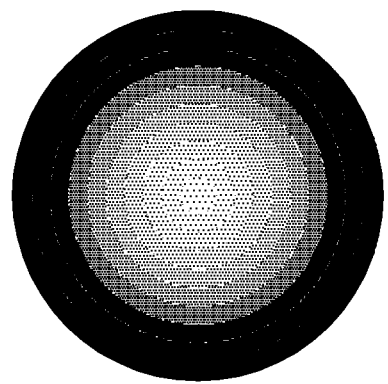
FIGS. 4A and 4B are a diagram and a graph illustrating a shape and intensity of a Gaussian laser beam, respectively, according to an embodiment.
Figure 4B:
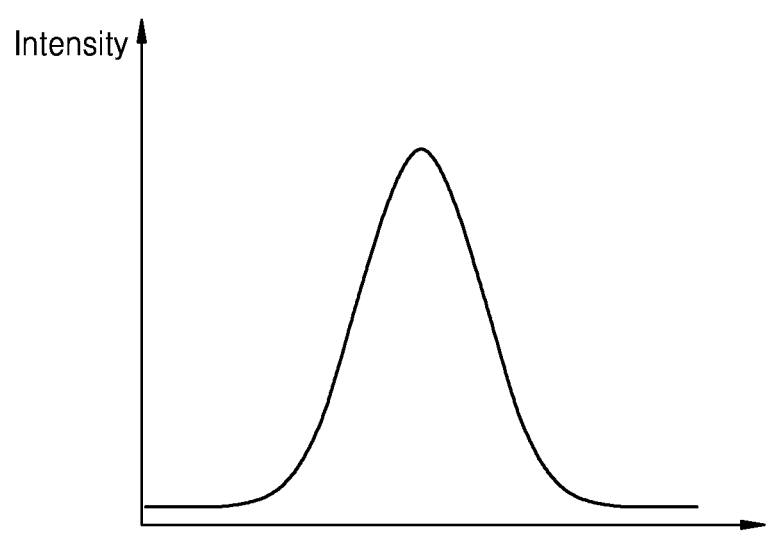

FIGS. 4A and 4B illustrate a shape and intensity of a laser beam of a Gaussian distribution, respectively. FIG. 4A illustrates a shape of a circular Gaussian laser beam, and FIG. 4B is a graph illustrating an intensity distribution of the circular Gaussian laser beam of FIG. 4A along an arbitrary diameter thereof. For example, the circular Gaussian laser beam may have a circular cross-sectional shape cross-sectioned perpendicularly with respect to a proceeding direction of the circular Gaussian laser beam.

A Gaussian distribution is a distribution in which a frequency distribution curve is symmetrical with respect to a mean value. Referring to the graph of FIG. 4B, the intensity of the circular Gaussian laser beam is symmetrical along a diameter of the circular Gaussian laser beam in a plan view, is greatest at the center, and decreases away from the center. The circular Gaussian laser beam may have spatially homogeneous polarization (for example, linear or circular). For example, the Gaussian laser beam may be linearly polarized or circularly polarized throughout the laser beam. For example, a laser beam having spatially homogeneous polarization may have the same polarization throughout a cross-section of the laser beam perpendicular to the proceeding direction of the laser beam. For example, the polarization of a laser beam having a spatially homogeneous polarization may not depend on its spatial position throughout the cross-section of the laser beam. For example, FIG. 4B shows a Gaussian energy distribution of the laser beam.

In the inventive concept, to prevent the scattering of the laser beam in the substrate or protect the semiconductor elements formed in the substrate, the circular Gaussian laser beam (FIG. 4A) may be modulated into a beam of a shape in which there is no beam in the vicinity of a direction parallel with a laser dicing direction, and may enter the substrate S.

FIGS. 4C through 4I are respective diagrams of modulated laser beams that have a shape in which there is no beam in the vicinity of a direction parallel with a laser dicing direction according to some embodiments.

Figure 4C:
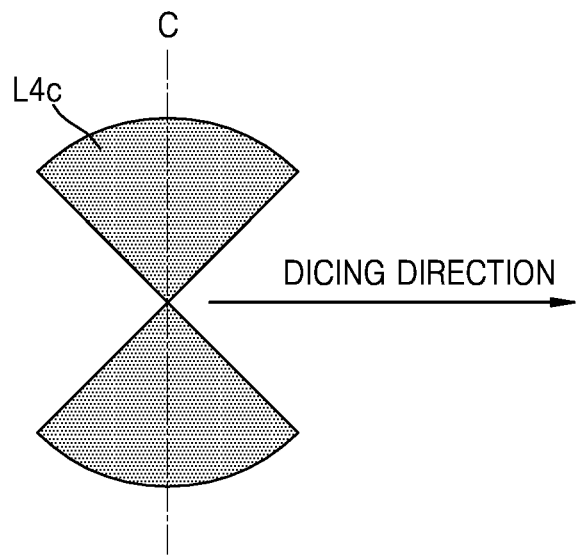
FIGS. 4C through 4E are diagrams illustrating examples of 8-shaped laser beams, respectively, according to an embodiment.
Figure 4D:
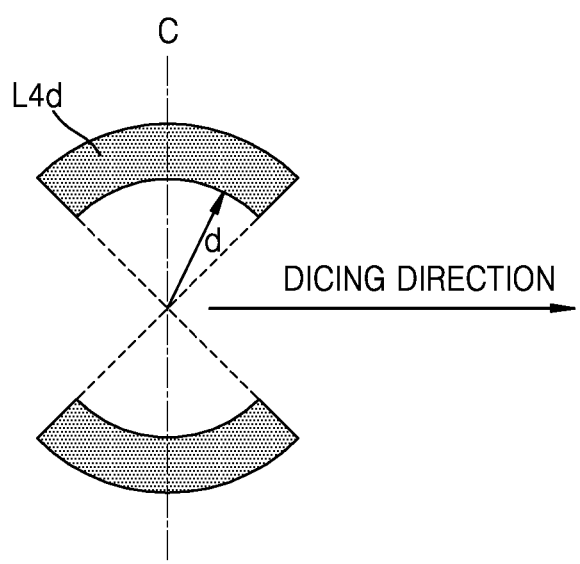
Figure 4E:
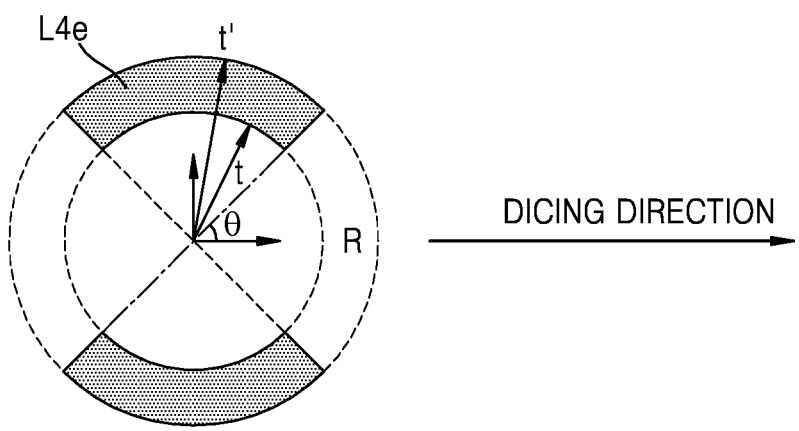

Referring to FIGS. 4C through 4E, the shape of the modulated laser beams incident on the substrate S may be 8-shaped. Although the 8-shaped laser beams illustrated in FIGS. 4C through 4E may have some differences in shape from each other, in common, a beam may be absent or a beam intensity may be relatively low in the vicinity of a direction parallel with a laser dicing direction from the center of the 8-shaped laser beam, while the beam intensity in the vicinity of a direction perpendicular to the laser dicing direction from the center of the 8-shaped laser beam may be higher than that in the vicinity of the direction parallel with the laser dicing direction. Below, the shapes and characteristics of the 8-shaped laser beams are described in detail.

Referring to FIG. 4C, in some embodiments of the inventive concept, an 8-shaped laser beam L4c may have a shape of an hourglass. The 8-shaped laser beam L4c may have no beam or have a relatively low intensity in the vicinity of the direction parallel with the laser dicing direction from the center thereof. However, the intensity of the 8-shaped laser beam L4c in the vicinity of the direction perpendicular to the laser dicing direction at the center of the 8-shaped laser beam L4c may be greater than that in the vicinity of the direction parallel with the laser dicing direction at the center of the 8-shaped laser beam L4c.

When a straight line c passing through the center of the hourglass-shaped 8-shaped laser beam L4c is drawn in the direction perpendicular to the laser dicing direction in a plan view, the intensity of the hourglass-shaped 8-shaped laser beam L4c may be greater in the vicinity of the center thereof where the straight line c crosses, while the intensity may be less away from the center thereof along the straight line c. The intensity of the hourglass-shaped 8-shaped laser beam L4c may be uniform along the straight line c. The hourglass-shaped 8-shaped laser beam L4c may also have polarization that is not symmetrical with respect to a central axis, e.g., extending along the laser beam proceeding direction. The hourglass-shaped 8-shaped laser beam L4c may be generated by modulating the Gaussian laser beam by using an optical modulation module such as a slit or a spatial beam modulator, which is described later. When the Gaussian laser beam is modulated into the 8-shaped laser beam L4c by using a slit, the intensity of the 8-shaped laser beam L4c may be high in the vicinity of the center, and when the Gaussian laser beam is modulated into the 8-shaped laser beam L4c by using a spatial beam modulator, the intensity of the 8-shaped laser beam L4c may be not only high in the vicinity of the center but also uniform along the straight line c.

Referring to FIG. 4D, an 8-shaped laser beam L4d illustrated in FIG. 4D may have a shape in which there is no beam up to a portion apart by a certain distance d from the center of the hourglass shape. For example, the laser beam L4d may have two separated portions separated from each other in a plan view as shown in FIG. 4D. These two portions of the laser beam L4d may be arranged in a perpendicular direction to the laser dicing direction for the center between the two portions move along the laser dicing line in a plan view. The 8-shaped laser beam L4d may be absent or low up to the portion apart by the certain distance d from the center thereof. In addition, the 8-shaped laser beam L4d may have no beam or have a relatively low intensity in the vicinity of the direction parallel with the laser dicing direction from the center thereof. However, the intensity of the 8-shaped laser beam L4d in the vicinity of the direction perpendicular to the laser dicing direction at the center thereof may be greater than that in the vicinity of the direction parallel with the laser dicing direction at the center thereof.

The 8-shaped laser beam L4d illustrated in FIG. 4D may be generated by modulating the Gaussian laser beam by using a combination of a birefringent lens and a slit, which is described later.

Referring to FIG. 4E, an 8-shaped laser beam L4e illustrated therein may have a shape in which there is no beam up to a portion apart by a first distance t from the center of the hourglass shape. As illustrated in FIG. 4E, the 8-shaped laser beam L4e may have different intensity according to a 360-degree rotation of an azimuth ⊖ in a ring-shaped region R that is farther than the first distance t and shorter than a second distance t' from the center. The beam intensity of the 8-shaped laser beam L4e in the ring-shaped region R may be relatively high in the vicinity of the azimuth ⊖ of about 90 degrees and about 270 degrees (that is, in the vicinity of the direction perpendicular to the laser dicing direction at the center of the 8-shaped laser beam L4e), while the beam intensity may be relatively low in the vicinity of the azimuth ⊖ of about 0 degrees and about 180 degrees (that is, in the vicinity of the direction parallel with the laser dicing direction at the center of the 8-shaped laser beam L4e).

Figure 4F:
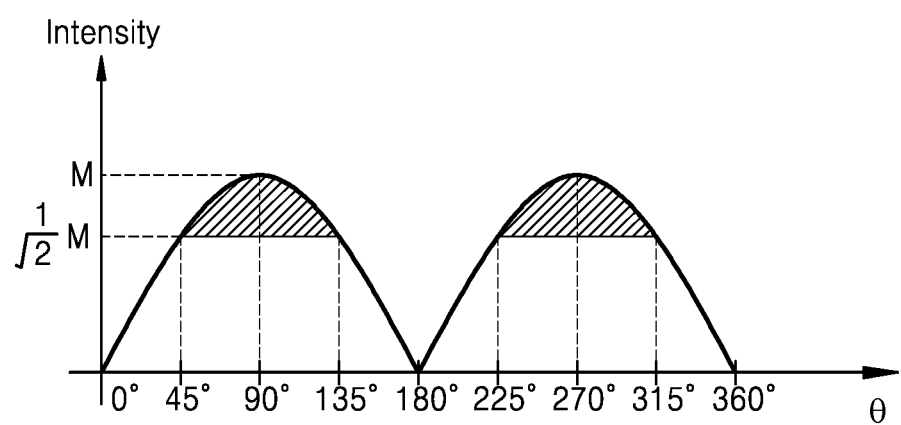
FIG. 4F is a graph illustrating intensity of the 8-shaped laser beam illustrated in FIG. 4E according to an azimuth angle, according to an embodiment.

FIG. 4F illustrates a graph of intensity in the ring-shaped region R according to the 360-degree rotation of the azimuth ⊖ of the 8-shaped laser beam L4e illustrated in FIG. 4E.

Referring to FIG. 4F, the intensity of the 8-shaped laser beam L4e in the ring-shaped region R may have an absolute value a sine curve according to the 360-degree rotation of the azimuth ⊖. When the azimuth ⊖ is about 90 degrees and about 270 degrees, the intensity of the 8-shaped laser beam L4e may have a maximum value M, and when the azimuth ⊖ is about 0 degrees and about 180 degrees, there may be no beam. In the graph of FIG. 4F, hatched portions are where the intensity of the 8-shaped laser beam is equal to or greater than 1/SQRT(2)*M (where SQRT(2) represents a square root of 2) and equal to or less than the maximum value M. Referring to FIG. 4F, the intensity of the 8-shaped laser beam L4e in a section where the azimuth ⊖ is about 45 degrees to about 135 degrees and about 225 degrees to about 315 degrees may be equal to or greater than 1/SQRT(2)*M and equal to or less than the maximum value M.

A beam intensity in the portions where the beam intensity is equal to or greater than 1/SQRT(2) of the maximum value M (that is, the azimuth ⊖ is about 45 degrees to about 135 degrees and about 225 degrees to about 315 degrees) may be the main beam intensity for a laser dicing of the substrate. Thus, when portions having an intensity equal to or greater than 1/SQRT(2) of the maximum value M and equal to or less than the maximum value M are illustrated, a result thereof may be represented as the shape of the 8-shaped laser beam 4Le illustrated in FIG. 4E.

The 8-shaped laser beam of FIG. 4E may be formed by modulating a ring shape CVB having polarization symmetrical with respect to a central axis by using a polarizer filter, which is described in detail later.

In an operation of dicing the substrate by collecting/focusing the 8-shaped laser beams illustrated in FIGS. 4C through 4F inside the substrate, side portions of the 8-shaped form, in which the beam is absent or the beam intensity is relatively low, may contact/overlap a dicing line, while top and bottom portions of the 8-shaped form, in which the beam intensity is relatively high, may be apart from the dicing line on the substrate. Accordingly, an 8-shaped laser dicing beam, which is incident on the substrate and relatively moves in a dicing direction with respect to the substrate, may not overlap the pre-formed modified regions and cracks and may not be scattered in the substrate, and thus, inside of the substrate may not be damaged by laser beam scattering.

Figure 4G:
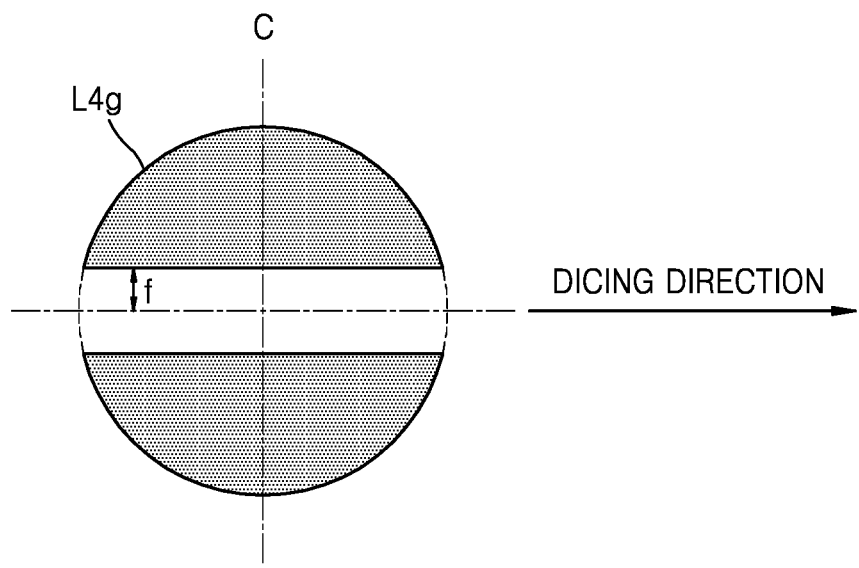
FIGS. 4G through 4I are diagrams of shapes of modulated laser beams, respectively, according to some embodiments.
Figure 4H:
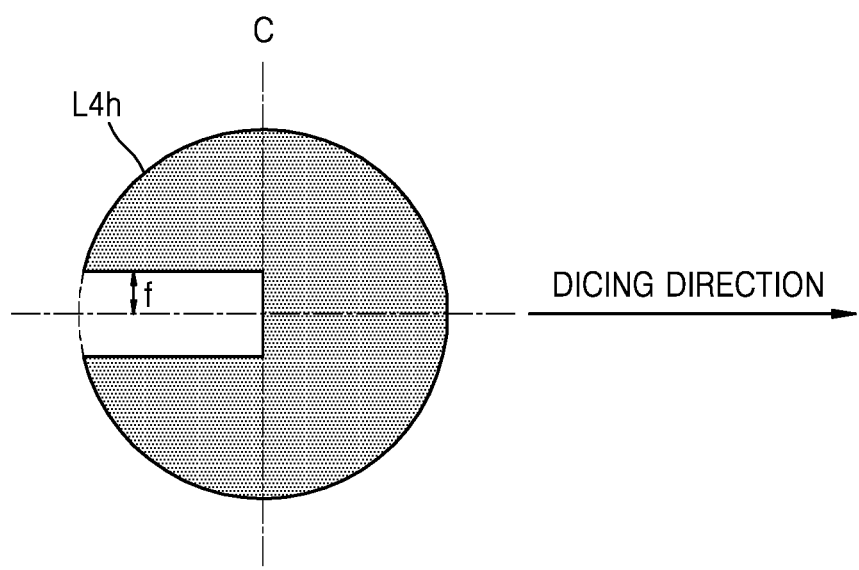
Figure 4I:
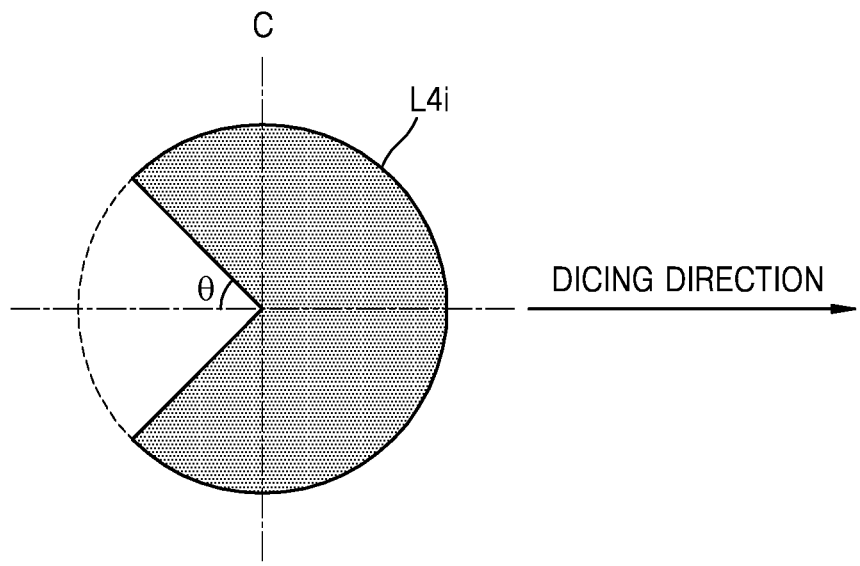

FIGS. 4G through 4I are diagrams of shapes of modulated laser beams L4g, L4h, and L4i, according to some embodiments, respectively. The modulated laser beams L4g, L4h, and L4i to be described with reference to FIGS. 4G through 4I may be different in shapes from the 8-shaped laser beams described with reference to FIGS. 4C through 4F, but may be similar to the 8-shaped laser beams in that there is no beam or a beam intensity is low in the vicinity of the direction parallel with the laser dicing direction.

Referring to FIG. 4G, the modulated laser beam L4g according to the present embodiment may have a shape in which there is no beam of a laser beam of a circular shape from the dicing line passing through the center of the circular shape to a portion vertically apart by a certain distance f from the dicing line in a plan view. For example, the modulated laser beam L4g may have two separated portions of beam separated by a center portion overlapping with the dicing line in a plan view.

The modulated laser beam L4g in FIG. 4G may be formed by passing a circular Gaussian laser beam through a slit (refer to 601b in FIG. 6B), which will be described in detail later. When the circular Gaussian laser beam is modulated into the modulated laser beam L4g through the slit 601b, intensity of the modulated laser beam L4g may be relatively high in the vicinity of the center of the beam and may be relatively low in the vicinity of a boundary of the beam.

Referring to FIG. 4H, the modulated laser beam L4h according to the present embodiment may have a shape in which there is no beam from a center toward opposite direction of the dicing direction of a laser beam of a circular shape and from the dicing line passing through the center of the circular shape to a portion vertically apart by the certain distance f from the dicing line in a plan view.

When the straight line c passing through the center of the modulated laser beam L4h in the direction perpendicular to the laser dicing direction is drawn, with respect to the line c, the modulated laser beam L4h may have no beam or a low beam intensity in a direction opposite to the laser dicing direction from a center, and from the dicing line to the portion vertically apart by the certain distance f from the dicing line. The modulated laser beam L4h may not be modulated in the laser dicing direction from the center (e.g., with respect to the line c), and thus may have an intact semicircular shape (e.g., from the center toward the laser dicing direction). The modulated laser beam L4h in FIG. 4H may be formed by passing a laser beam of a circular shape through a slit (refer to 601c in FIG. 6C), which will be described in detail later. When the Gaussian laser beam is modulated into the modulated laser beam L4h through the slit 601c, intensity of the modulated laser beam L4h may be relatively high in the vicinity of the center and may be relatively low in the vicinity of a boundary.

Referring to FIG. 4I, the modulated laser beam L4i may have a shape in which there is no beam in a certain portion formed by the azimuth Θ (e.g., a sector) in an opposite direction to the dicing direction from the center of a circular shape that rotates with respect to the center of the modulated laser beam L4i.

When the line c passing through the center of the modulated laser beam L4i in the direction perpendicular to the laser dicing direction is drawn, with respect to the line c, the modulated laser beam L4i may have no beam or a low beam intensity in a direction opposite to the laser dicing direction, and in a certain portion of a sector shape formed by the rotating azimuth θ. For example, the modulated laser beam L4i may not be modulated in the laser dicing direction from the center (e.g., with respect to the line c), and thus may have an intact semicircular shape (e.g., from the center toward the laser dicing direction).

The azimuth Θ may be about 30 degrees to about 60 degrees with respect to the laser dicing line. For example, the azimuth Θ may be about 45 degrees with respect to the laser dicing line.

The modulated laser beams L4g, L4h, and L4i according to FIGS. 4G through 4I may have no beam or a relatively low beam intensity in the vicinity of the direction parallel with the laser dicing direction, and the beam intensity in the vicinity of the direction perpendicular to the laser dicing direction from the center of the modulated laser beams L4g, L4h, and L4i may be higher than the beam intensity in the vicinity of the direction parallel with the laser dicing direction from the center of the modulated laser beams L4g, L4h, and L4i. Accordingly, the modulated laser beams L4g, L4h, and L4i that are incident on the substrate S and relatively move in the laser dicing direction with respect to a substrate subject to being diced may not overlap the preformed modified region P and the crack C, and may not be scattered in the substrate S. Thus, semiconductor elements formed inside the substrate S may not be damaged.

Figure 5:
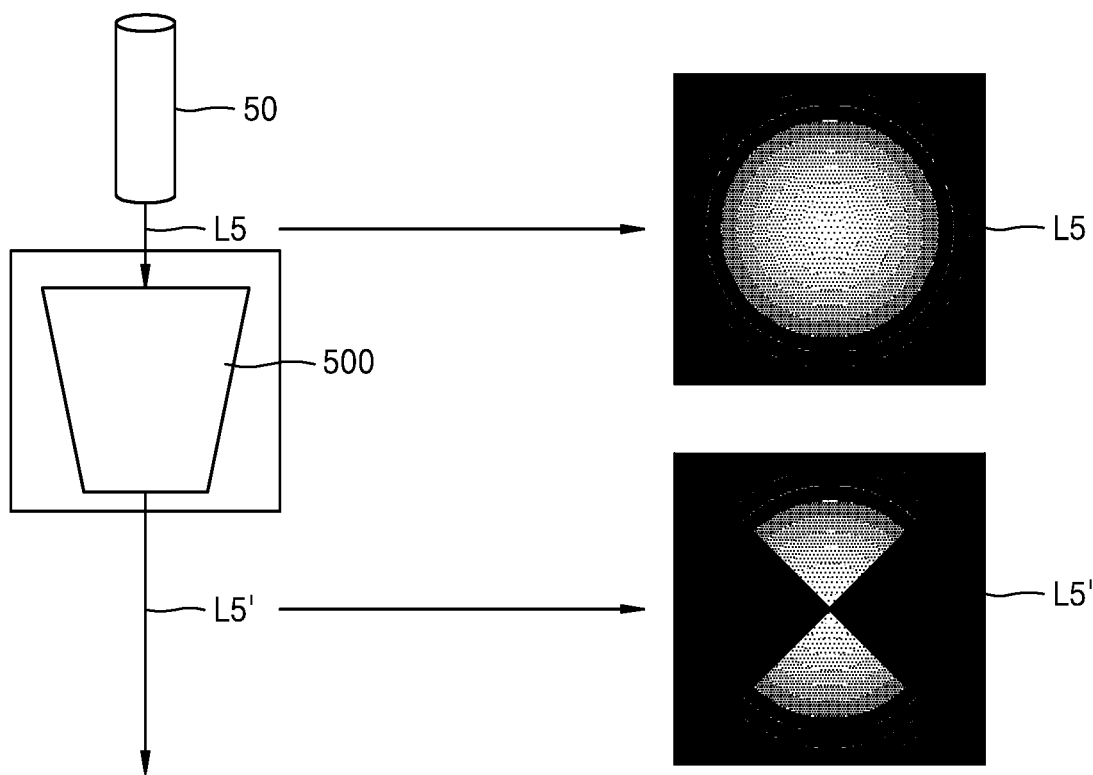
FIG. 5 is a diagram of a laser beam modulating unit modulating a Gaussian laser beam into the 8-shaped laser beam, according to an embodiment.

FIG. 5 is a diagram of a laser beam modulating unit 500 modulating a shape of a Gaussian laser beam L5 by reducing intensity of the Gaussian laser beam L5 in the vicinity of the direction parallel with the laser dicing direction, according to an embodiment.

Referring to FIG. 5, according to an embodiment, the Gaussian laser beam L5 emitted from the laser beam emitter 50 may be modulated into the 8-shaped laser beam L5' via the laser beam modulating unit 500. When the modulated 8-shaped laser beam L5' is incident on the substrate, the incident 8-shaped laser beam L5' may not spatially overlap the pre-formed modified regions and cracks as described above, and thus, the scattering of the beam L5' inside the substrate may be prevented or reduced and accordingly, the semiconductor elements formed in the substrate may not be damaged.

Hereinafter, a method of modulating the Gaussian laser beam into a laser beam that has a relatively weak intensity in the vicinity of the direction parallel with the laser dicing direction is described in more detail with some embodiments of the inventive concept.

FIGS. 6A through 6D are diagrams of a laser beam modulating unit 600 using slits 601a through 601d, respectively, according to some embodiments.

Figure 6A:
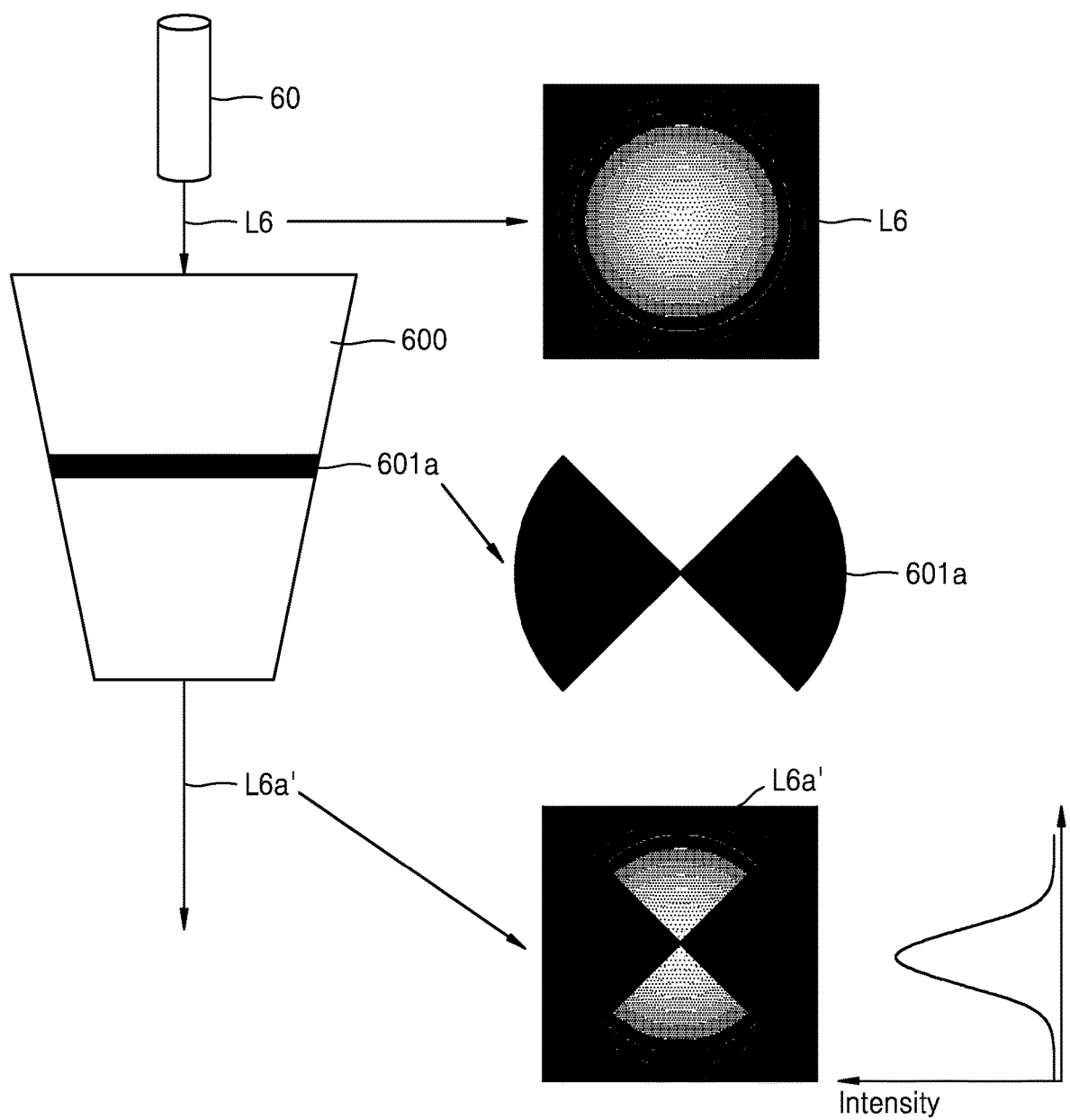
FIG. 6A through 6D are diagrams of a laser beam modulating unit using slits, respectively, according to some embodiments.

Referring to FIG. 6A, the laser beam modulating unit 600 may use the slit 601a to modulate the Gaussian laser beam L6 emitted from a laser beam emitter 60 into an 8-shaped laser beam L6a'.

The slit 601a may block and/or pass light depending on shapes or positions of the light. The slit 601a, which is an element of the laser beam modulating unit 600, may pass a portion of the Gaussian laser beam L6 and block the other portion of the Gaussian laser beam L6 from passing therethrough.

As illustrated in FIG. 6A, the slit 601a may have a 90 degree-rotated 8-shaped form or an infinity symbol shaped (∞-shaped) form. In certain embodiments, the laser beam modulating unit 600 may include a plurality of slits, e.g., instead of the slit 601a. Side portions of the Gaussian laser beam L6 emitted from the laser beam emitter 60 may be blocked by the slit 601a, while top and bottom portions of the Gaussian laser beam L6 may not be blocked by the slit 601a. Thus, a portion of the Gaussian laser beam L6 may be blocked by the slit 601a and be modulated into an 8-shaped laser beam L6a'. Since the modulated 8-shaped laser beam L6a' has no change in an optical mode of the Gaussian laser beam L6, the beam intensity may be relatively high in the vicinity of a central portion and be relatively low at side portions, similar to the Gaussian laser beam.

Figure 6B:
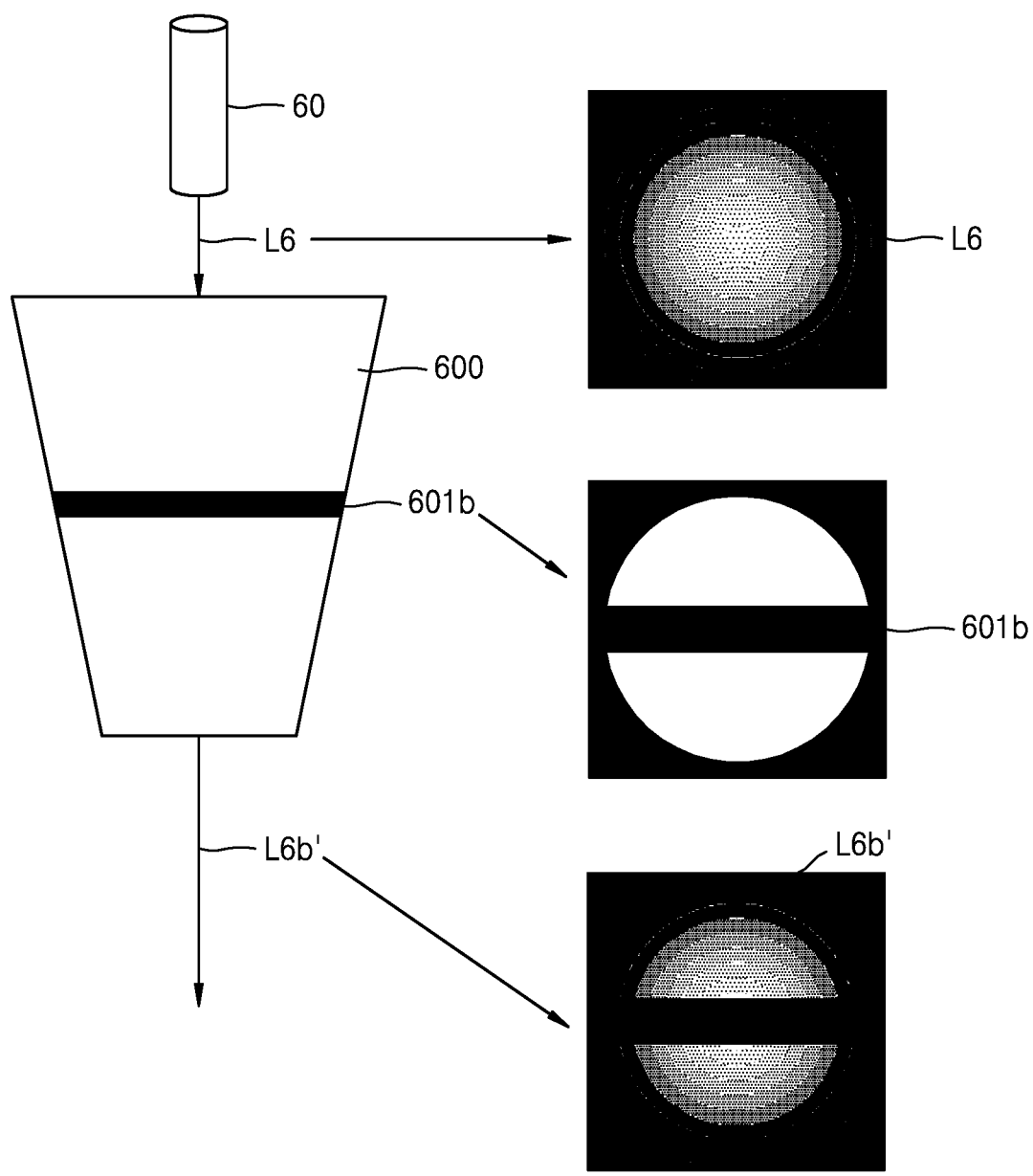
Figure 6C:
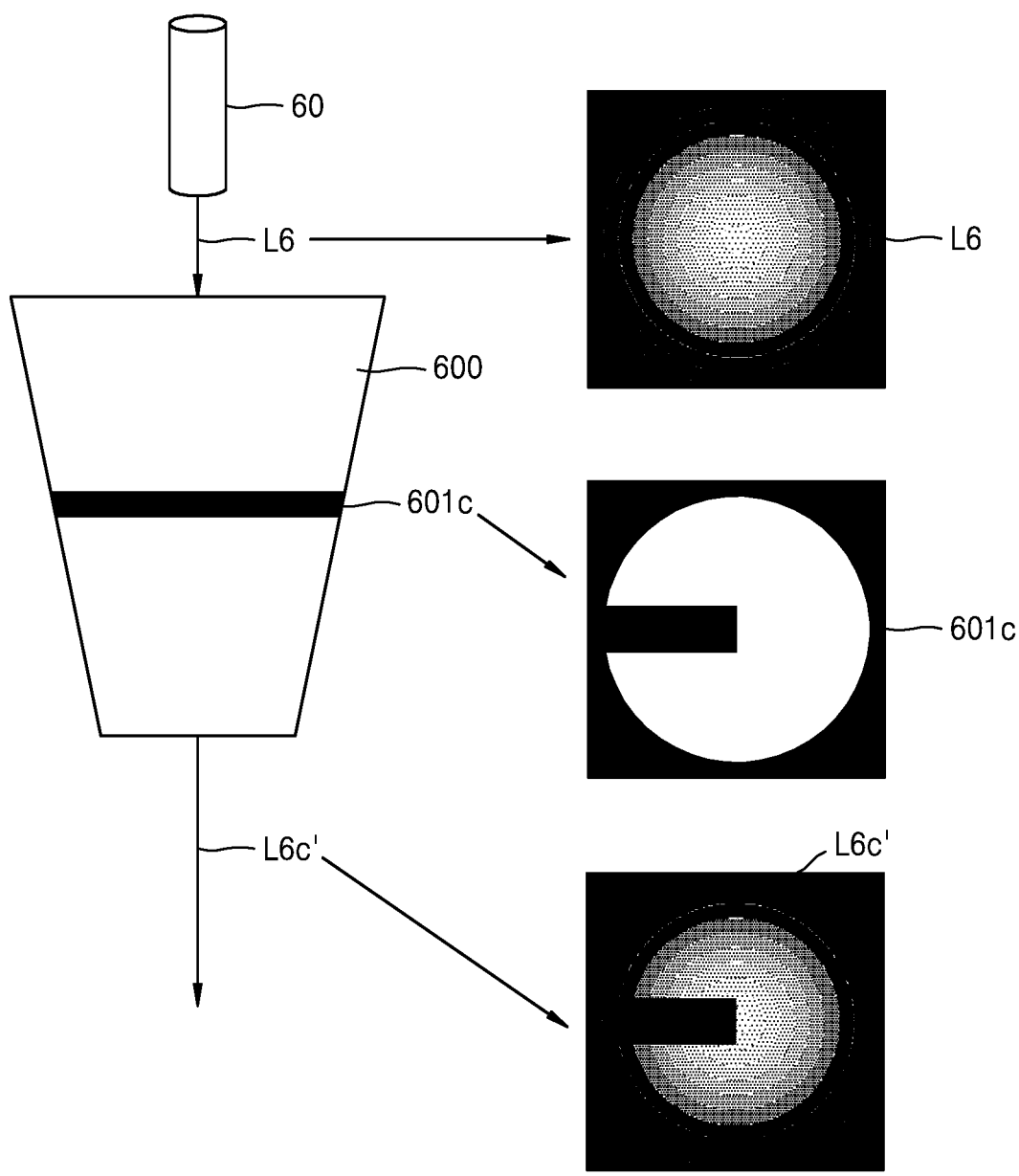
Figure 6D:
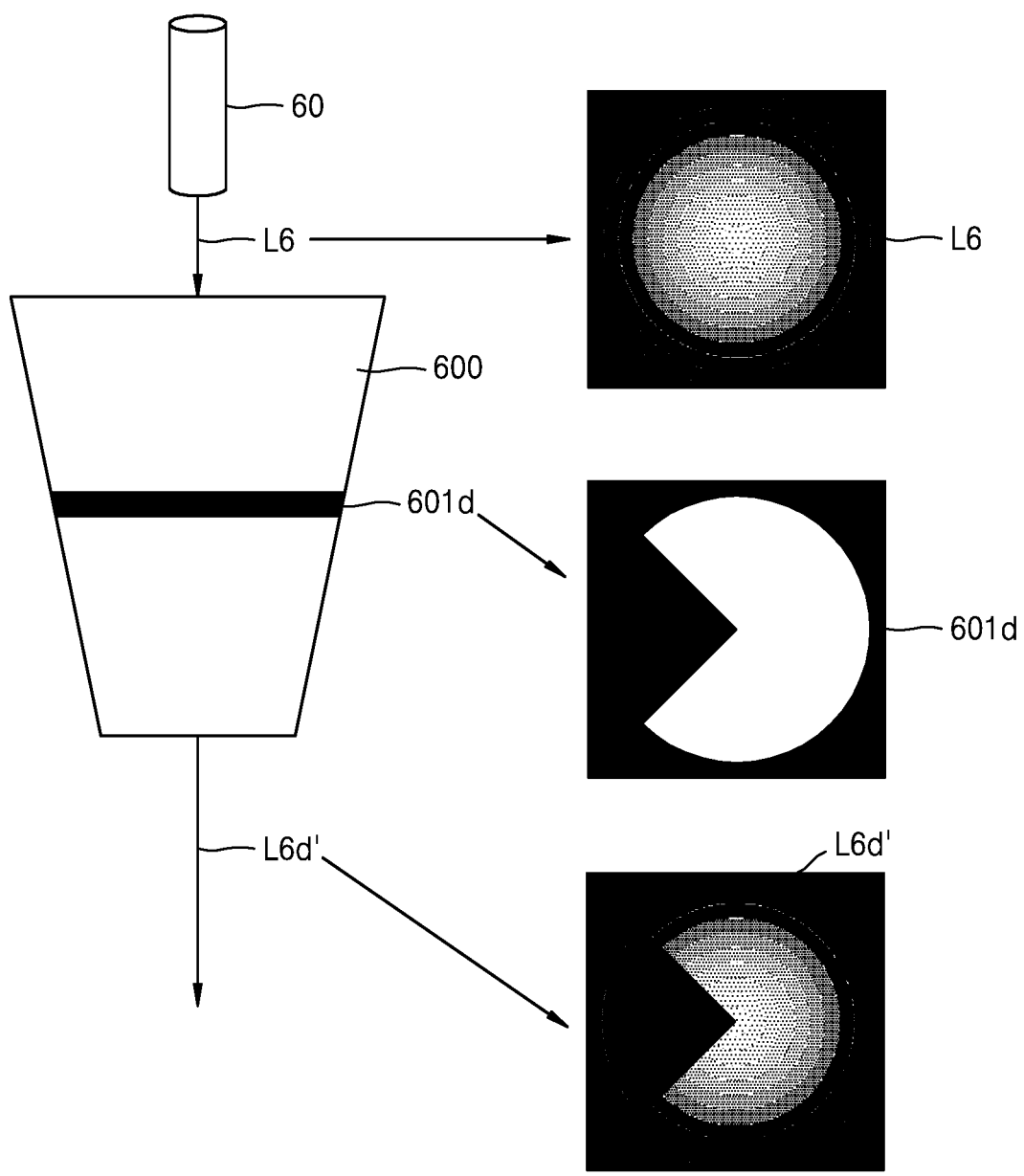

Referring to FIGS. 6B through 6D, the slits 601b, 601c, and 601d according to the present embodiments may have various shapes, and thereby, the Gaussian laser beam L6 may be modulated into variously shaped laser beams L6b', L6c', and L6d' in which there is no beam in the vicinity of the direction of the laser dicing direction.

Referring to FIG. 6B, the slit 601b may have a plate shape in which two semicircular holes are formed on a top and on a bottom. The semicircular holes may be formed as a top semicircular hole and a bottom semicircular hole by a lane horizontally passing through the center of a circle.

The Gaussian laser beam L6 of a circular shape emitted from the laser beam emitter 60 may be modulated into a laser beam of a shape in which there is no beam from a line horizontally passing through the center of the circle to a portion apart by a certain distance by the slit 601b. Since the modulated laser beam L6b' may have no optical mode change from the Gaussian laser beam L6, the beam intensity of the modulated laser beam L6b' may be relatively high in the central portion and relatively low in side portions, similar to the Gaussian laser beam L6.

Contents and the technical idea of the modulated laser beam L6b' may be substantially the same as contents and the technical idea described above with reference to FIG. 4G. Accordingly, the modulated laser beam L6b' may have no beam or a relatively low intensity in the vicinity of the direction parallel with the laser dicing direction. Accordingly, the modulated laser beam L6b' may not overlap the preformed modified region P and the crack C, and may not be scattered in the substrate S. Thus, semiconductor elements formed inside the substrate S may not be damaged by the scattered laser.

Referring to FIG. 6C, an empty portion of the slit 610c may be formed from a circular empty portion by adding a lane horizontally passing from the center toward an edge of the circle.

The Gaussian laser beam L6 of a circular shape emitted from the laser beam emitter 60 may be modulated into a laser beam L6c' of a shape in which there is no beam from the laser dicing line horizontally passing through the center of the circle to a certain portion vertically apart by a certain distance from the laser dicing line in an opposite direction to the laser dicing direction from the center of the beam. The modulated laser beam L6c' in a direction opposite to the laser dicing direction may have no beam or a low beam intensity in the certain portion vertically apart by the certain distance from the laser dicing line. The modulated laser beam L6c' may not be modulated in the laser dicing direction with respect to the center of the modulated laser beam L6c', and thus may have an intact semicircular shape in the laser dicing direction from the center.

Contents and the technical idea of the modulated laser beam L6c' may be substantially the same as contents and the technical idea described above with reference to FIG. 4H. Since the modulated laser beam L6c' has no change in an optical mode of the Gaussian laser beam L6, the beam intensity of the modulated laser beam L6c' may be relatively high in the vicinity of a central portion of the modulated laser beam L6c' and may be relatively low at side portions of the modulated laser beam L6c', similar to the Gaussian laser beam L6. Accordingly, the modulated laser beam L6c' may not overlap the preformed modified region P and the crack C, and may not be scattered in the substrate S. Thus, semiconductor elements formed inside the substrate S may not be damaged by a laser beam scattering.

Referring to FIG. 6D, an empty portion of the slit 601d may be formed by a plate of a sector shape that is formed from a circular shaped empty portion in the direction opposite to the laser dicing direction with respect to the center of a circle.

The circular Gaussian laser beam L6 emitted from the laser beam emitter 60 may be modulated into a laser beam L6d' of a shape in which there is no beam in a portion of the sector shape by the slit 601d.

The modulated laser beam L6d' may have no beam or a relatively low beam intensity in the portion of the sector shape in the direction opposite to the laser dicing direction. A portion of the modulated laser beam L6d' may not be modulated in the laser dicing direction and thus may have an intact semicircular shape in the laser dicing direction.

Contents and the technical idea of the modulated laser beam L6d' may be substantially the same as contents and the technical idea of the modulated laser beam L4i described above with reference to FIG. 4I. For example, the modulated laser beam L6d' may have no beam or a relatively low beam intensity in the vicinity of the direction parallel with the laser dicing direction. Accordingly, the modulated laser beam L6d' may not overlap the preformed modified region P and the crack C, and may not be scattered in the substrate S. Thus, semiconductor elements formed inside the substrate S may not be damaged by a laser beam scattering.

Figure 7:
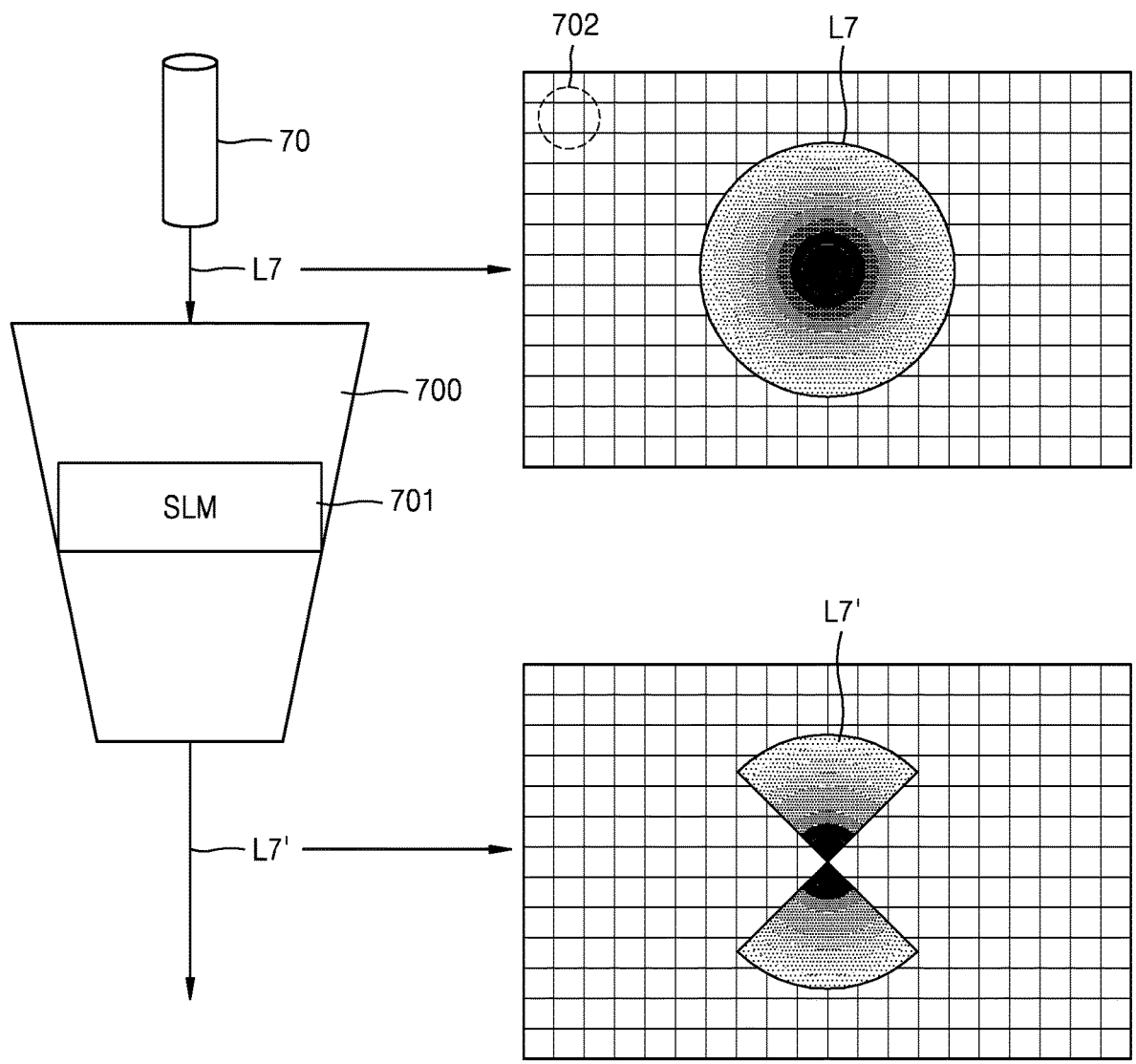
FIG. 7 is a diagram of a laser beam modulating unit using a spatial laser beam modulation module according to an embodiment.

FIG. 7 is a diagram of a laser beam modulating unit 700 using a spatial light modulator (SLM) 701 according to an embodiment. Referring to FIG. 7, the laser beam modulating unit 700 may modulate a shape of a Gaussian laser beam L7 by using the SLM 701. The SLM 701 may modulate the shape of the Gaussian laser beam L7 by reducing intensity of the Gaussian laser beam L7 in the vicinity of the direction parallel with the laser dicing direction. According to an embodiment, the SLM 701 may modulate the Gaussian laser beam L7 into an 8-shaped laser beam L7'. For example, the SLM 701 may be used as a spatial laser beam modulator.

The SLM 701 is a device in which light emitted from a light source and incident on the SLM 701 is modulated with an external electrical signal and the modulated light is output. The modulated light may have a different information from the light incident on the SLM 701. The SLM 701 may change a voltage to modulate an intensity of the circular Gaussian laser beam L7 incident thereon by adjusting a rotation direction of a polarization plane of the light incident into a medium.

For example, the SLM 701 may include a plurality of pixels 702 and may modulate the intensity and a phase of the circular Gaussian laser beam L7 input to each pixel 702 by using an externally applied voltage.

Accordingly, the Gaussian laser beam L7 emitted from the laser beam emitter 70 may be modulated into a laser beam of a shape in which there is no beam in the vicinity of the direction parallel with the laser dicing direction, for example, the 8-shaped laser beam L7' by the intensity and phase changes at each pixel 702 of the SLM 701. In this case, unlike the case of using the slit 601, since a modulation of the intensity and phase of the beam is possible at each pixel 702 in the SLM 701, the intensity at a central portion of the 8-shaped laser beam L7' may be relatively high while the intensity of the 8-shaped laser beam L7' may be low at side portions thereof. Alternatively, the intensity of the 8-shaped laser beam L7' may be uniform throughout. Compared with the cases of using the slits 601a through 601d in FIGS. 6A through 6D, the SLM 701 in FIG. 7 may freely adjust the intensity and phase of the incident beam.

Figure 8:
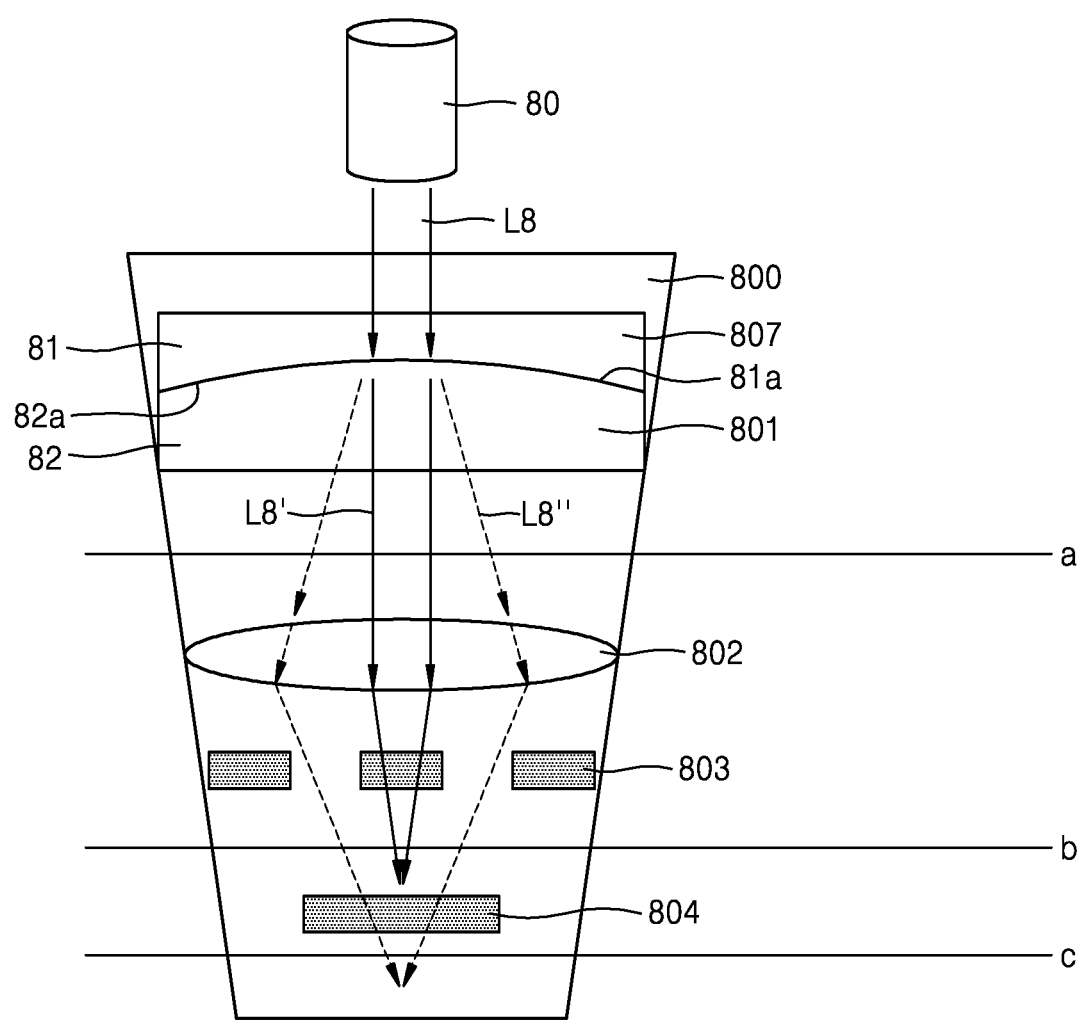
FIG. 8 is a diagram of a laser beam modulating unit using a birefringent lens according to an embodiment.
Figure 9A:
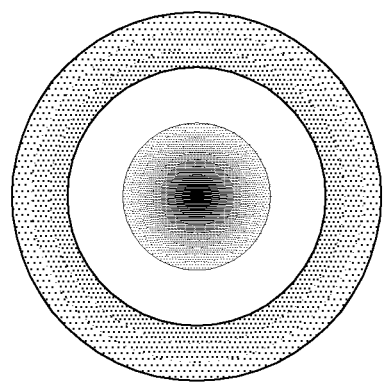
FIGS. 9A through 9C are diagrams of modulation states of the Gaussian laser beam L8 illustrated in FIG. 8, according to an embodiment.
Figure 9B:
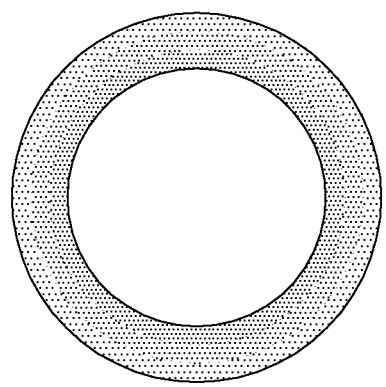
Figure 9C:
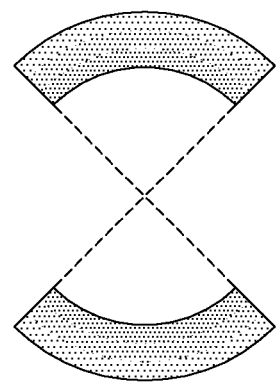

FIG. 8 is a diagram of a laser beam modulating unit 800 using a birefringent lens 801 according to an embodiment. FIGS. 9A through 9C are diagrams of modulation states of a Gaussian laser beam L8 according to FIG. 8, according to an embodiment.

Referring to FIG. 8, the laser beam modulating unit 800 may include the birefringent lens 801, an object lens 802, a center slit 803, and a side slit 804 to modulate the circular Gaussian laser beam L8 into an 8-shaped laser beam (FIG. 9C).

The laser beam modulating unit 800 in FIG. 8 may include the birefringent lens 801, the object lens 802, the center slit 803, and the side slit 804. The birefringent lens 801 may be constructed by combining a vitreous body 81 having a concave surface 81a and a crystal body 82 having a convex surface 82a. For example, the vitreous body 81 may be a body formed of vitreous material. For example, the vitreous body 81 may be formed of gelatinous material. For example, the crystal body 81 may be a solid body. The birefringent lens 801 may separate/split the circular Gaussian laser beam L8 into a first separated beam L8' indicated by a solid line and a second separated beam L8" indicated by a dashed line. The first separated beam L8' may be a linearly polarized beam in which a vibration direction is orthogonal to a processing advancing direction (e.g., the dicing direction), and the second separated beam L8" may be a linearly polarized beam in which the vibration direction is parallel with the processing advancing direction (e.g., the dicing direction). The birefringent lens 801 may allow the first separated beam L8' to pass therethrough without refraction and may allow the second separated beam L8" to pass therethrough after being refracted outward by the crystal body 82.

Referring to FIGS. 8 and 9, when the circular Gaussian laser beam L8 passes through the birefringent lens 801, the circular Gaussian laser beam L8 may be modulated to have a shape in which there is a small circle in a circular ring in a plan view as shown in FIG. 9A. For example, a rod-like Gaussian laser beam L8 may be modulated into a smaller rod-like beam and a cylindrical beam enclosing the smaller rod-like beam.

The object lens 802 in FIG. 8 may condense the first and second separated beams L8' and L8" separated by the birefringent lens 801. The second separated beam L8" separated by the birefringent lens 801 may form the beam-focusing point at a deeper position than the first separated beam L8' that has not been refracted and passed through the crystal body 82. For example, the focusing points of the first and second separated beams L8' and L8" may be different from each other.

The first and second separated beams L8' and L8" that have passed through the object lens 802 may be a laser beam in which a small circle is formed at the center by the first separated beam L8' in a plan view as shown in FIG. 9A, and the small circle portion may be filtered from the laser beam to leave the circular ring by the center slit 803. Thus, the laser beams having passed through the center slit 803 may be modulated into a ring-shaped laser beam as shown in FIG. 9B. For example, the center slit 803 may block a center portion of the laser beam passing through the center slit 803.

A side portion of the laser beam which has passed through the center slit 803 and has the ring shape as shown in FIG. 9B may be filtered by the side slit 804. Accordingly, the laser beams having passed through the side slit 804 may be modulated into the 8-shaped laser beam as shown in FIG. 9C. For example, the side slit 804 may block a side portion of a laser beam passing through the side slit 804.

Thus, the circular Gaussian laser beam may be modulated into the 8-shaped laser beam as shown in FIG. 9C via the laser beam modulating unit 800 which includes the birefringent lens 801, the object lens 802, and the center and side slits 803 and 804 in FIG. 8. The 8-shaped laser beam (FIG. 9C) modulated by the laser beam modulating unit 800 may have a relatively low intensity at the center because the center portion of the laser beam is blocked when compared with the 8-shaped laser beam modulated by the laser beam modulating unit 600 using the slit 601 in FIG. 6. In one embodiment, the laser beam modulating unit 800 does not use an external power, which may be different from the embodiment of the SLM 701 illustrated in FIG. 7.

Hereinafter, embodiments are described in detail with reference to drawings, in which the mode of the circular Gaussian laser beam is changed and modulated into the CVB, and the CVB is finally modulated into an 8-shaped laser beam.

The CVB is a vector beam solution of a Maxwell equation that satisfies symmetry around an axis with respect to both amplitude and phase of a beam. The CVB may have radial and azimuthal polarizations. For example, the axis may be a central axis extending along a symmetrical center of the cylinder shape of the CVB.

Figure 10A:
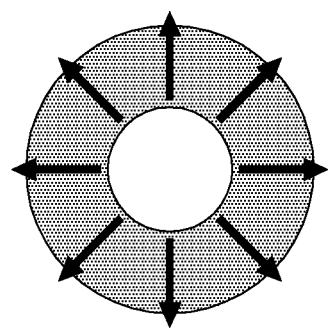
FIGS. 10A and 10B are diagrams of shapes of radial and azimuthal cylindrical vector beams (CVBs)
Figure 10B:
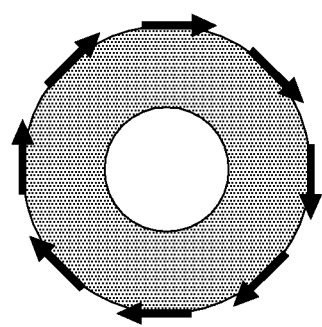
Figure 10C:
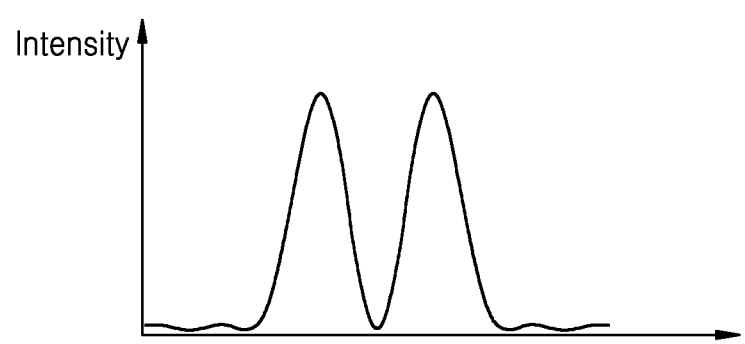
FIG. 10C is a graph illustrating intensity thereof, according to some embodiments.

FIG. 10A illustrates a CVB having radial polarization, and FIG. 10B illustrates a CVB having azimuthal polarization. For example, the radial polarization of the CVB of FIG. 10A may be a set of linearly polarized light arranged radially with respect to the center of the CVB in a plan view. For example, the azimuthal polarization of the CVB of FIG. 10B may be a set of linearly polarized light arranged azimuthally with respect to the center of the CVB in a plan view. The CVB may have a ring shape as illustrated in FIGS. 10A and 10B. Referring to FIG. 10C, the beam intensity of the CVB may get lower toward the center from a certain distance having a maximum intensity thereof and may get higher from the center toward sides to the certain distance having the maximum intensity thereof. The shape of the CVB may be substantially the same as that of the ring-shaped laser beam having a ring (e.g., the laser beam illustrated in FIG. 9B) generated due to a birefringent phenomenon in FIG. 8. However, the CVB may differ from the ring-shaped laser beam of FIG. 9B in that the direction of polarization of the CVB is symmetrical with respect to the axis while the direction of polarization of the ring-shaped laser beam is not symmetrical with respect to the central axis.

Figure 11:
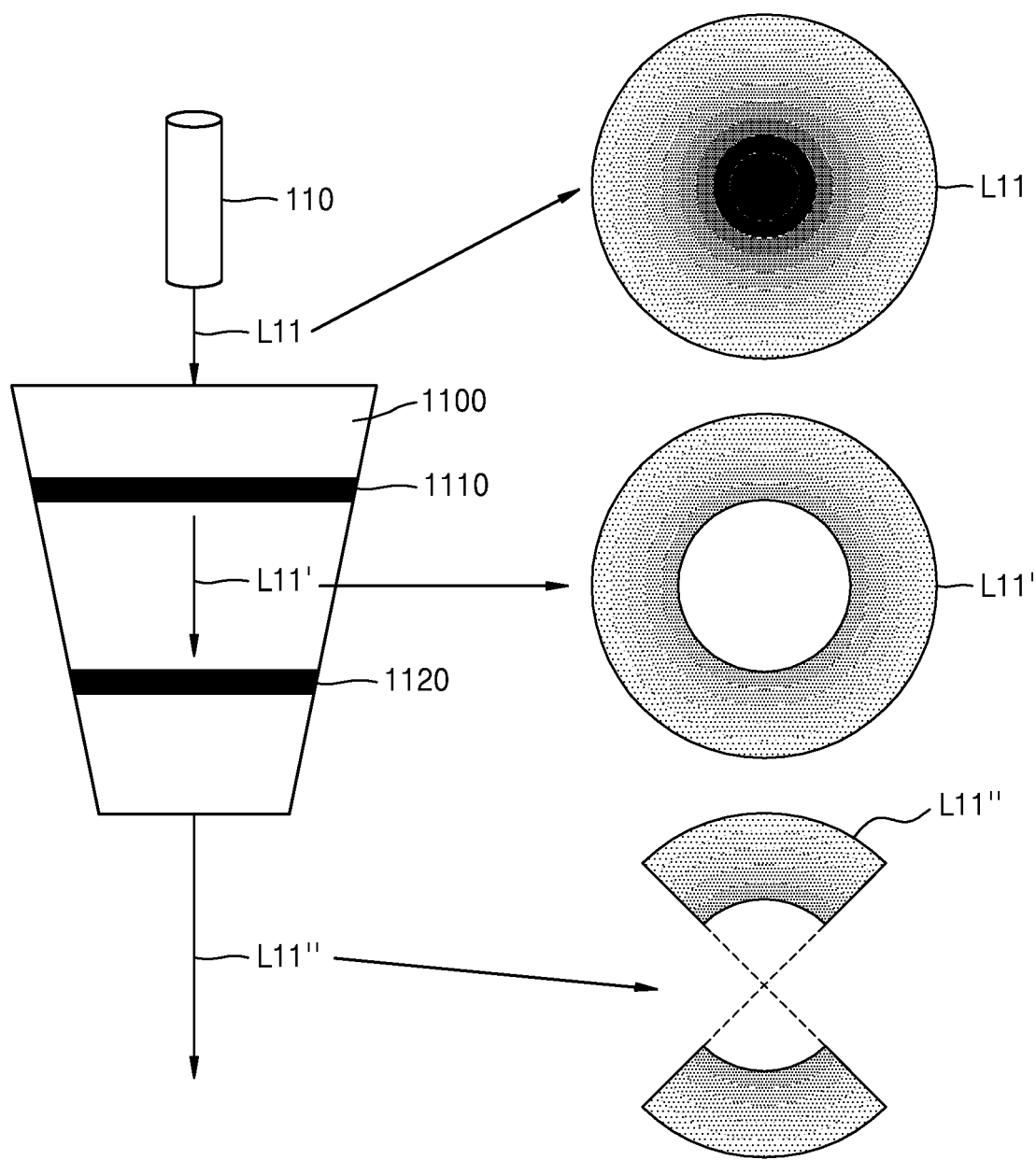
FIG. 11 illustrates a diagram of a laser beam modulating unit which modulates a circular Gaussian laser beam into a CVB and again modulates the CVB into an 8-shaped laser beam, according to an embodiment.

FIG. 11 illustrates a diagram of a laser beam modulating unit 1100 which modulates a circular Gaussian laser beam L11 into a CVB L11' and again modulates the CVB L11' into an 8-shaped laser beam L11", according to an embodiment; Referring to FIG. 11, the laser beam modulating unit 1100 may include a CVB modulation module 1110 and an 8-shaped laser beam modulation module 1120.

The CVB modulation module 1110 illustrated in FIG. 11 may modulate the circular Gaussian laser beam L11 emitted from the laser beam emitter 110 into a high-dimensional CVB L11' in which amplitude and phase are symmetrical with respect to the central axis. For example, a high-dimensional CVB may be a CVB for which amplitudes and phases of light in the CVB are symmetrical with respect to a central axis passing through a center of the CVB, e.g., in a plan view. The CVB L11' may be either the radial CVB (FIG. 10A) or the azimuth CVB (FIG. 10B) in which the direction of polarization is symmetrical with respect to the axis. A method of modulating the circular Gaussian laser beam L11 into the CVB L11' is described later in detail.

The CVB modulation module 1110 may be classified into two types according to a position thereof.

Firstly, the CVB modulation module 1110 may be combined with the laser beam emitter 110 and be together in one modulation system. In this case, the CVB L11' may be predominantly generated, and modes other than a high-dimensional mode of the CVB L11' may be suppressed in the modulation system. Since the CVB L11' in the CVB modulation module 1110 is predominantly generated, a structure of the modulation system may be miniaturized. However, a difficulty level of implementation of the CVB modulation module 1110 may be high. The CVB modulation module 1110 may include a conical Brewster prism (CBP), a Sagnac interferometer, a fiber-optic polarization controller, a special optical fiber, a fiber grating, etc.

Secondly, the CVB modulation module 1110 may be outside as a different system separate from the laser beam emitter 110. The CVB modulation module 1110, which is separate from the laser beam emitter 110 and is outside as another system, may modulate the circular Gaussian light L11 emitted from the laser beam emitter 110 into the CVB L11'. Since the CVB modulation module 1110 may be separate from the laser beam emitter 110, the CVB modulation module 1110 may be effectively applied to a semiconductor dicing facility using the circular Gaussian laser beam L11. However, since the complexity of an optical system of the CVB modulation module 1110 increases, a difficulty level in management may be high. The CVB modulation module 1110 may include, for example, an acoustic waver, a micro-structures grating, and the SLM.

The 8-shaped laser beam modulation module 1120 illustrated in FIG. 11 may modulate the CVB L11', which has been modulated by the CVB modulation module 1110, into a shape of the 8-shaped laser beam L11". When the modulated 8-shaped laser beam L11" is incident on the substrate, the incident 8-shaped laser beam L11" may not spatially overlap the preformed modified regions and cracks, and thus, the substrate may not be damaged by the scattering of the 8-shaped laser beam L11".

FIGS. 12 through 15 illustrate various embodiments in which circular Gaussian laser beams emitted from the laser beam emitter 110 are modulated into CVBs. A method of modulating a Gaussian laser beam to a CVB has been studied in various ways since 1972. CVB modulation embodiments disclosed below are described in Q. Zhan, Advances In Optics and Photonics, Vol. 1, 2009 and R. Zheng, C. Gu, A. Wang, L. Xu, H. Ming, An all-fiber laser generating cylindrical vector beam, Opt. Express 18, 2010, all of which are incorporated herein by reference.

Figure 12:
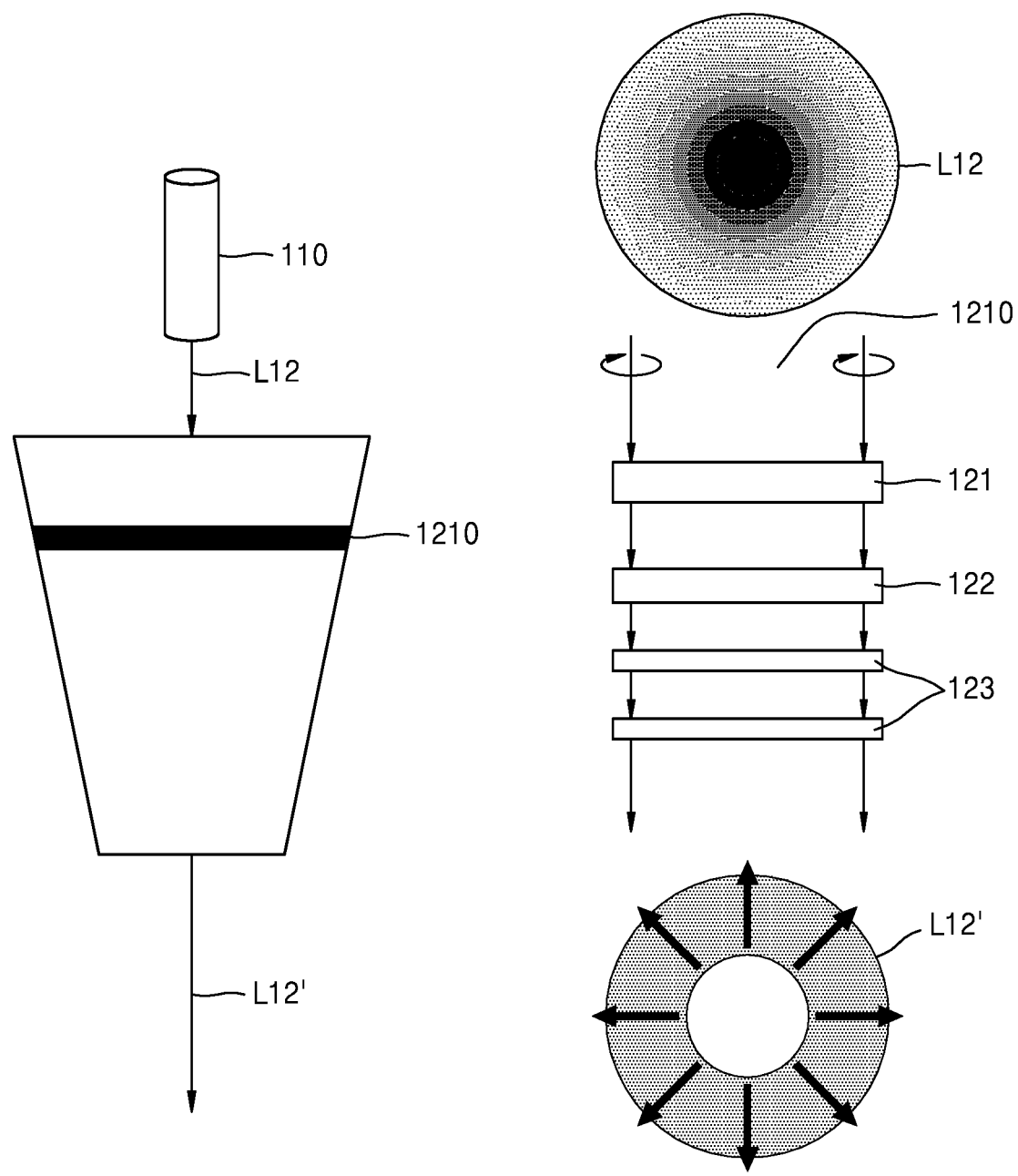
FIG. 12 is a diagram of a CVB modulation using spiral elements according to an embodiment.

FIG. 12 is a diagram of a CVB modulation module 1210 using spiral elements according to an embodiment. Referring to FIG. 12, the CVB modulation module 1210 using the spiral elements may include a radial analyzer 121, a spiral phase element (SPE) 122, and half-wave plates 123.

The CVB modulation module 1210 may modulate a circular Gaussian laser beam L12, which has spatially homogeneous polarization and is emitted from the laser beam emitter 110, into a CVB having spatially inhomogeneous polarization. The radial analyzer 121 may be a device in which a polarization transmission axis is aligned along one of the radial or azimuthal directions. The circular Gaussian laser beam L12 before being incident on the radial analyzer 121 may be a circular Gaussian laser beam having generally homogeneous polarization. For example, the circular Gaussian laser beam L12 before being incident may have either linear or circular homogeneous polarization. In certain embodiments, the circular Gaussian laser beam L12 may include linear polarization and circular polarization. In certain embodiments, the circular Gaussian laser beam L12 may include elliptical polarization. After the circular Gaussian laser beam L12 passes through the radial analyzer 121, the circular Gaussian laser beam L12 may be either radially or azimuthally polarized according to the direction of the polarization transmission axis of the radial analyzer 121.

The SPE 122 in FIG. 12 may have an opposite helicity to compensate for a geometric phase to modulate the circular Gaussian laser beam L12 into a CVB L12'. The SPE 122 may be produced in various methods such as electro-optical lithography and the SLM.

The half-wave plates 123 connected in series as shown in FIG. 12 may rotate the polarization of the circular Gaussian laser beam passing through the SPE 122 in a certain pattern.

Thus, referring to FIG. 12, the circular Gaussian laser beam L12 having spatially homogeneous polarization may pass through the radial analyzer 121, the SPE 122, and the half-wave plates 123 of the CVB modulation module 1210 and may be modulated into the CVB L12' that is either radially or azimuthally polarized.

Figure 13:
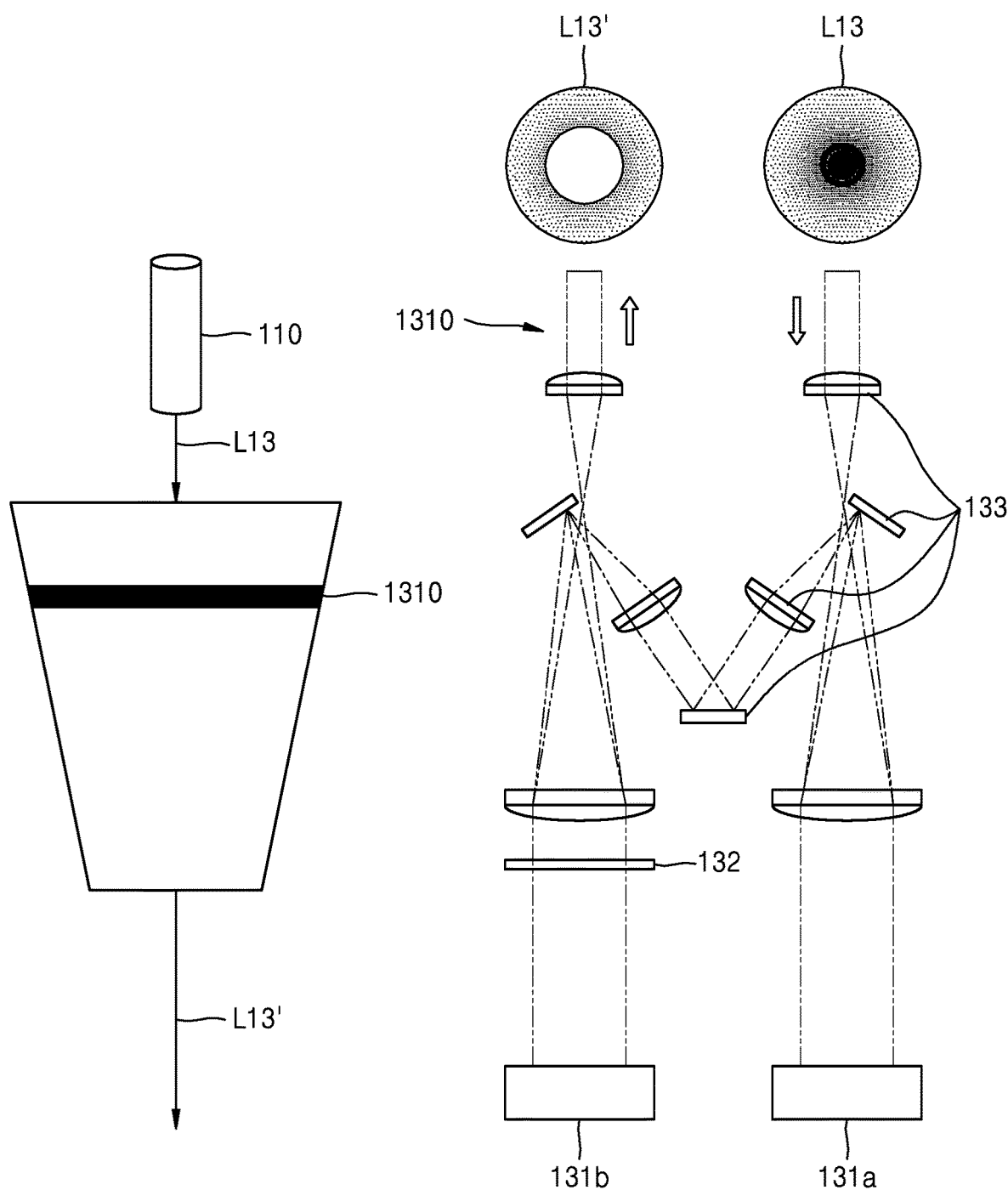
FIG. 13 is a diagram of CVB modulation using a plurality of spatial light modulators according to an embodiment.

FIG. 13 is a diagram of CVB modulation using a plurality of SLMs according to an embodiment. Referring to FIG. 13, the CVB modulation module 1310 using the plurality of SLMs may include a first SLM131a, a second SLM 131b, a quarter-wavelength plate 132, and a plurality of optical lenses 133. The circular Gaussian laser beam L13 incident on the CVB modulation module 1310 using the first and second SLMs 131a and 131b may be incident on the first SLM 131a via the plurality of optical lenses 133, and the first SLM 131a may modulate the incident circular Gaussian laser beam L13 into a phase pattern of the CVB. A phase-modulated laser beam may be incident on the second SLM 131b via the plurality of optical lenses 133 and the quarter-wavelength plate 132. The incident laser beam may pass through the quarter-wavelength plate 132 and the second SLM 131b and may be modulated into a ring-shaped CVB L13' having polarization that is symmetrical with respect to the central axis of the ring-shaped CVB L13'.

Thus, the circular Gaussian laser beam L13 of the Gaussian distribution may be modulated into the CVB L13' of either the radial or azimuthal polarization after having passed through the CVB modulation module 1310 of FIG. 13.

Figure 14:
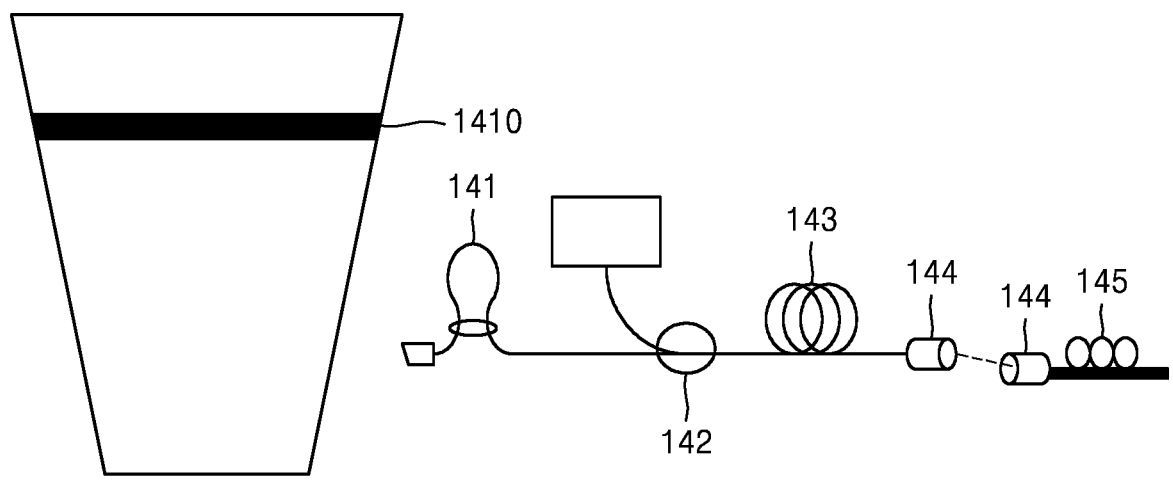
FIG. 14 is a diagram of CVB modulation using an optical fiber polarization controller according to an embodiment.

FIG. 14 is a diagram of a CVB modulation module 1410 using a fiber-optic polarization controller, according to an embodiment. Referring to FIG. 14, the fiber-optic polarization controller may include a loop mirror 141, a wavelength division multiplexer 142, an ytterbium optical fiber 143, a fiber collimator 144, and a polarization controller 145. A process of generating the CVB via the fiber-optic polarization controller is described in detail in R. Zheng, C. Gu, A. Wang, L. Xu, H. Ming, An all-fiber laser generating cylindrical vector beam, Opt. Express 18, 2010, all of which are incorporated herein by reference. A laser beam generated in the fiber-optic polarization controller may be a CVB having either the radial or azimuthal polarization, the CVB may be predominantly generated in the CVB modulation module 1410, and other modes different from the high dimensional CVB mode may be suppressed inside the CVB modulation module 1410.

Figure 15:
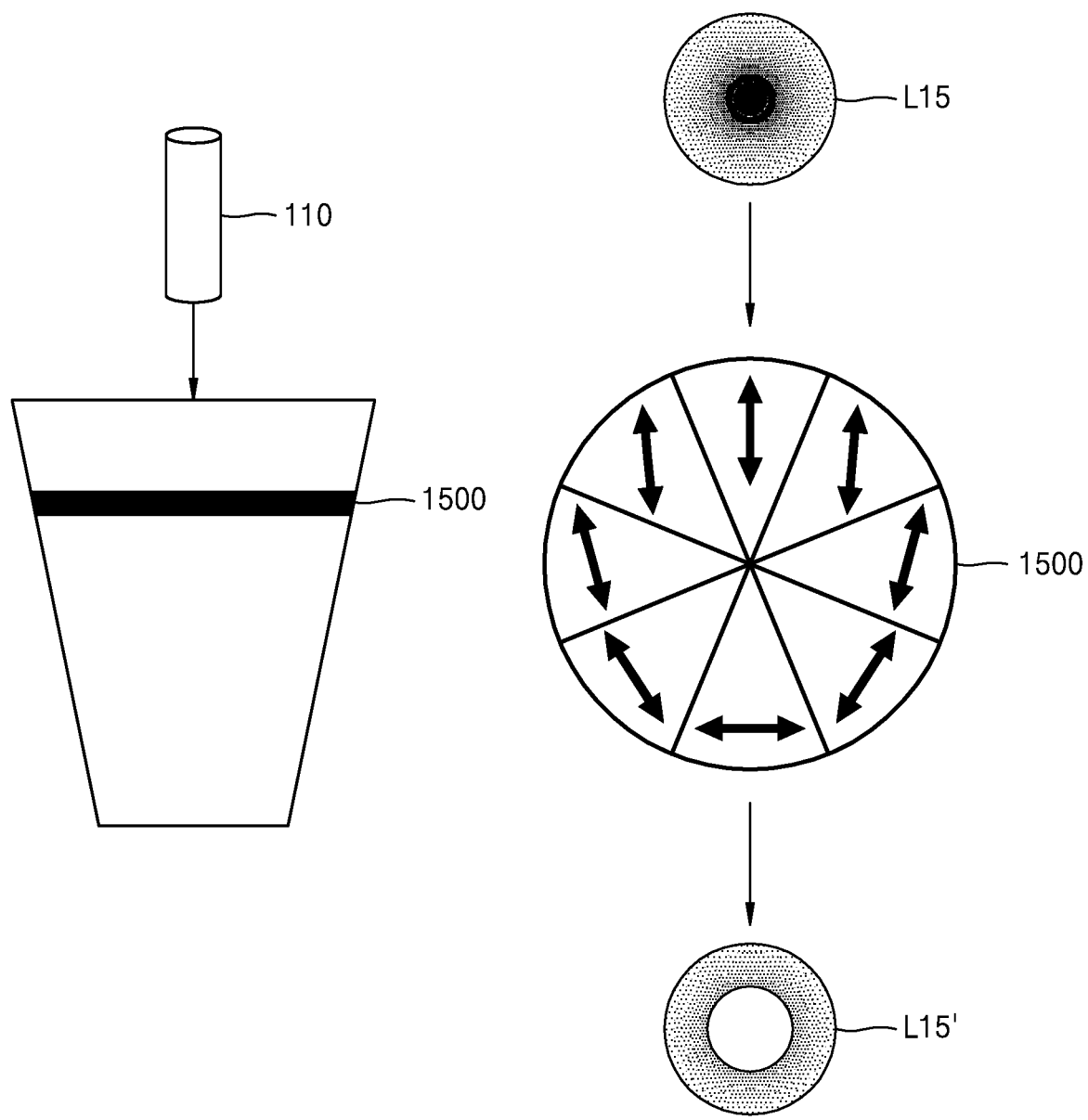
FIG. 15 is a diagram of CVB modulation using a spatially segmented half-wavelength plate according to an embodiment.

FIG. 15 is a diagram of a CVB modulation module using a spatially segmented half-wavelength plate 1500 according to an embodiment. Referring to FIG. 15, the CVB modulation module may include the spatially diversely segmented half-wavelength plate 1500. When a circular Gaussian beam L15 having spatially homogeneous polarization emitted from the laser beam emitter 110 is input to the spatially diversely segmented half-wavelength plate 1500, the circular Gaussian laser beam L15 having the spatially homogeneous polarization via the spatially diversely segmented half-wavelength plate 1500, which offers spatially different axes directions, may be modulated into a CVB L15' having polarization symmetrical with respect to each axis. For example, the spatially diversely segmented half-wavelength plate 1500 may have symmetrical optical axes structure with respect to an axis crossing the spatially diversely segmented half-wavelength plate 1500 in a plan view. This result may be achieved by bonding a plurality of segmented half-wavelength plates, which have different crystal angles from each other, into one plate. Accordingly, the circular Gaussian laser beam L15 may be modulated into the CVB L15' by using the spatially diversely segmented half-wavelength plate 1500. In certain embodiments, each segment of the plurality of segmented half-wavelength plates may include a linear polarizer having a polarization axis different from that of other linear polarizers. In certain other embodiments, a plurality of segmented linear polarizers may be used instead of the plurality of segmented half-wavelength plates of the above embodiment.

By using the CVB modulation modules in various embodiments illustrated in FIGS. 12 through 15, a circular Gaussian laser beam emitted from a laser beam emitter may be modulated into a CVB. However, the CVB is not limited thereto and may be formed in various ways.

For example, embodiments of a CVB modulation module, which is combined with a laser beam emitter as one system and predominantly generates the CVB, may include the CBP, the Sagnac interferometer, the fiber-optic polarization controller, special optical fibers, and fiber gratings. In certain embodiments, the CVB modulation module, which is separate from the laser beam emitter as another system and generates the CVB, may include an acoustic waver, a micro-structures grating, an SLM, etc.

A CVB modulation module of the inventive concept may be any of the CVB modulation modules described above, but embodiments are not limited thereto. The CVB modulation module of the inventive concept may include other CVB modulation modules including more various devices. A CVB modulated through the CVB modulation module may have either radial polarization (e.g., the beam shown in FIG. 10A) or azimuthal polarization (e.g., the beam shown in FIG. 10B).

Figure 16:
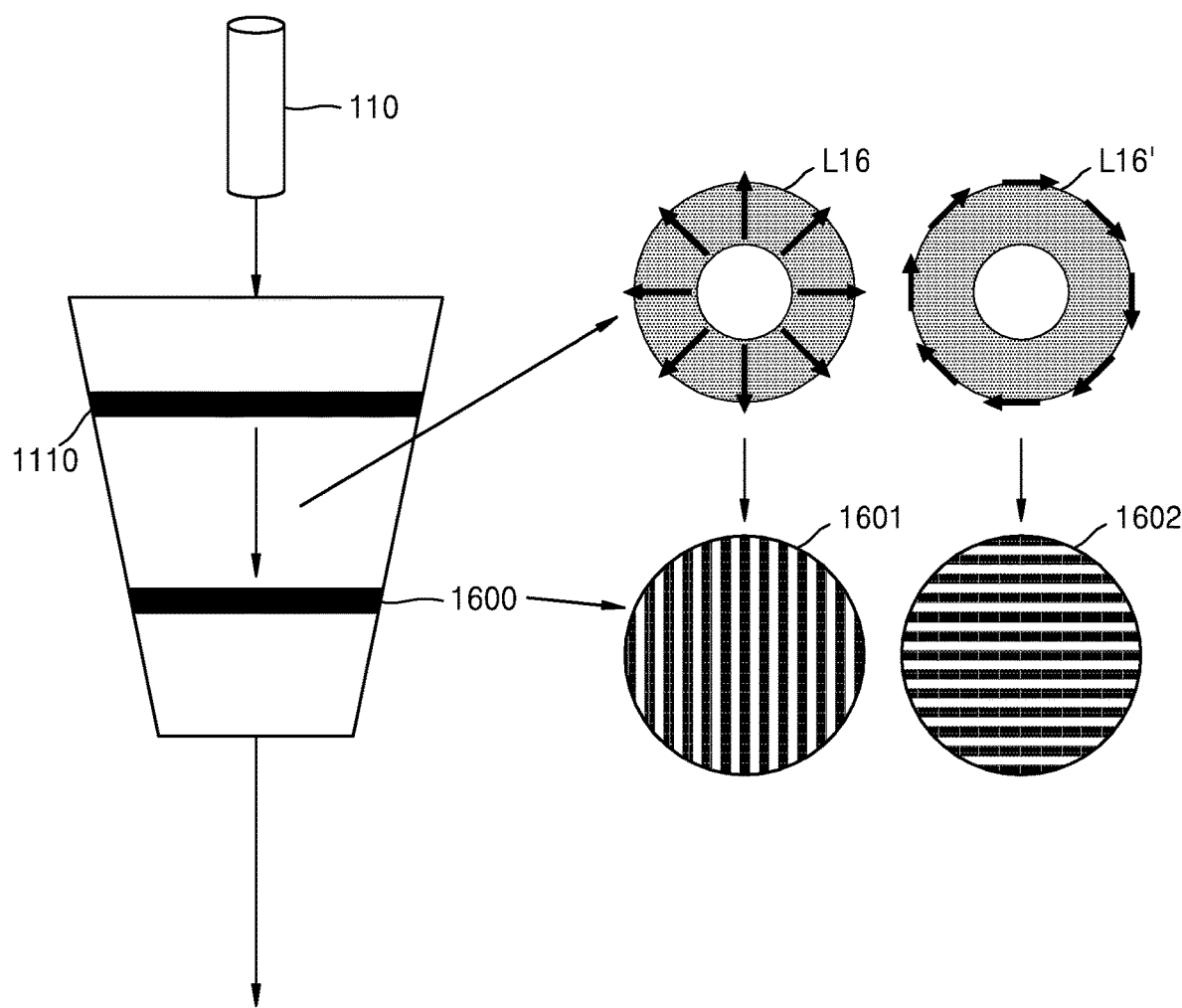
FIG. 16 illustrates diagrams of polarizing filters as examples of the 8-shaped beam modulation module, according to an embodiment.

FIG. 16 illustrates diagrams for explaining polarizing filters as examples of an 8-shaped laser beam modulation module 1600 according to an embodiment. Referring to FIG. 16, a radially polarized CVB L16 modulated by the CVB modulation module 1110 or an azimuthally polarized CVB L16' modulated by the CVB modulation module 1110 may be incident on the 8-shaped laser beam modulation module 1600. The modulated radially and azimuthally polarized CVBs L16 and L16' may be modulated into 8-shaped laser beams through the 8-shaped laser beam modulation module 1600. The 8-shaped laser beam modulation module 1600 may include a polarizing filter and may include either a vertical polarizing filter 1601 or a horizontal polarizing filter 1602 as an example.

A polarizing filter is a kind of a filter used to produce a linear polarization of light. The polarizing filter may be manufactured by applying needle-like iodine quinine crystal to a thin film including cellulose nitrate, and then, aligning the thin film in one direction with an electrical field or a magnetic field therein. Light in which a polarization direction is aligned with a direction of the needle-like crystal may be well absorbed, while light in which the polarization direction is orthogonal to the direction of the needle-like crystal may pass through the polarizing filter. Accordingly, the polarization direction of the light having passed through the polarizing filter may be orthogonal to the direction of the needle-like crystal, and the light having passed therethrough may be linearly polarized light.

Figure 17A:
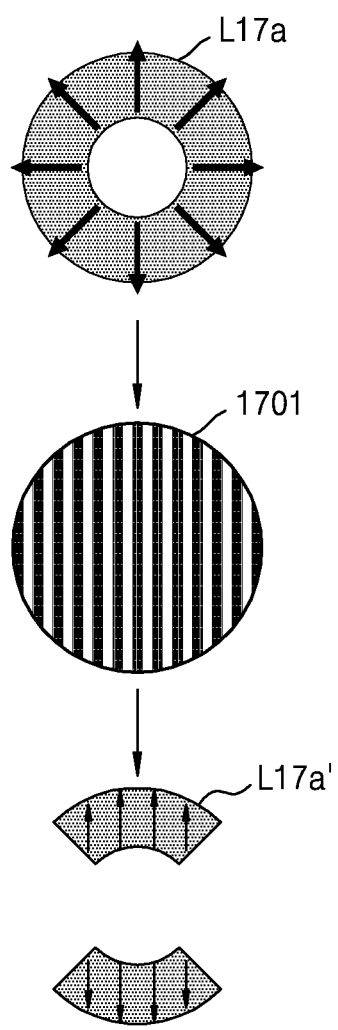
FIG. 17A illustrates diagrams of changing states in which a radial CVB is modulated into an 8-shaped beam via a vertical polarizing filter, according to an embodiment.
Figure 17B:
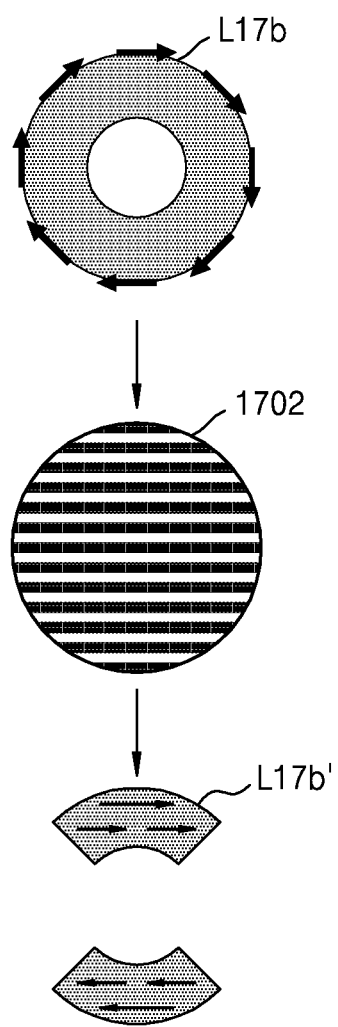
FIG. 17B illustrates diagrams of changing states in which an azimuthal CVB is modulated into an 8-shaped beam via a horizontal polarizing filter, according to an embodiment.

FIGS. 17A and 17B are diagrams illustrating changing states in which a radial CVB L17a and an azimuthal CVB L17b are modulated into an 8-shaped beam L17a' and an 8-shaped beam L17b' via a vertical polarizing filter 1701 and a horizontal polarizing filter 1702, respectively, according to some embodiments.

Referring to FIG. 17A, the radial CVB L17a having radial polarization may be modulated into the 8-shaped laser beam L17a' via the vertical polarizing filter 1701. The vertical polarizing filter 1701 may pass only a portion of the radial CVB L17a that has polarization including a vertical vector component and may not pass a portion of the radial CVB L17a that has polarization including a horizontal vector component. For example, vertical vector component of the radial CVB L17a may pass the vertical polarizing filter 1701, and horizontal vector component of the radial CVB L17a may not pass the vertical polarizing filter 1701. Thus, when the horizontal axis and the vertical axis are drawn with respect to the center of a ring shape of the radial CVB L17a, the polarization direction of the radial CVB L17a along the horizontal axis is orthogonal to a direction (e.g., polarization axis) of the vertical polarizing filter 1701, and the light along the horizontal axis may be blocked by the vertical polarizing filter 1701 and thus, may not exist after the radial CVB L17a passes through the vertical polarizing filter 1701. On the vertical axis, the polarization direction of the radial CVB L17a is parallel with the polarization axis of the vertical polarizing filter 1701, and thus, light may not be blocked by the vertical polarizing filter 1701 and may pass therethrough. Diagonal polarization vectors (e.g., inclined vectors with respect to the horizontal and the vertical axes) of the radial CVB L17a may be decomposed into components in the horizontal axis and the vertical axis, and a horizontal axis component of the polarization vector may be blocked by the vertical polarizing filter 1701, while a vertical axis component of the polarization vector may not be blocked by the vertical polarizing filter 1701 and may pass therethrough. Thus, the radial CVB L17a having radial polarization may be modulated into the 8-shaped laser beam L17a' by the vertical polarizing filter 1701. The 8-shaped laser beam L17a' modulated from the radial CVB L17a may have, as illustrated in FIG. 17A, the polarization vector including the vertical axis component that is parallel with the direction (e.g., the polarization axis) of the vertical polarizing filter 1701. Referring to FIG. 17A, arrows illustrated inside the 8-shaped laser beam L17a' may denote intensities and polarization directions of the modulated 8-shaped laser beam L17a'. Arrows illustrated in the 8-shaped laser beam L17a' in FIG. 17A may be parallel with polarization axis of the vertical polarizing filter 1701 and may be longer in the vicinity of the vertical axis (that is, in the vicinity of about 90 degrees and about 270 degrees) than in an away place from the vertical axis, which indicates that the polarization vector of the modulated 8-shaped laser beam L17a' is parallel with the polarization axis of the vertical polarizing filter 1701 and the intensity of the polarization vector is relatively high in the vicinity of the vertical axis (that is, in the vicinity of about 90 degrees and about 270 degrees) and is relatively low going away from the vertical axis.

Similarly, referring to FIG. 17B, the azimuthal CVB L17b having azimuthal polarization may be modulated into the 8-shaped laser beam L17b' via the horizontal polarizing filter 1702. The horizontal polarizing filter 1702 may pass only a portion of the azimuthal CVB L17b that has polarization including a horizontal vector component and may not pass a portion of the azimuthal CVB L17b that has polarization including a vertical vector component. For example, horizontal vector component of the azimuthal CVB L17b may pass the horizontal polarizing filter 1702, and vertical vector component of the azimuthal CVB L17b may not pass the horizontal polarizing filter 1702. Thus, when the horizontal axis and the vertical axis are drawn with respect to the center of a ring shape of the azimuthal CVB L17b, the polarization direction of the azimuthal CVB L17b along the vertical axis is orthogonal to the direction (e.g., the polarization axis) of the horizontal polarizing filter 1702, and the light along the vertical axis may be blocked by the horizontal polarizing filter 1702 and may not exist after the azimuthal CVB L17b passes through the horizontal polarizing filter 1702. On the vertical axis, the polarization direction of the azimuthal CVB L17*b* is parallel with the polarization axis of the horizontal polarizing filter 1702, and thus, light may not be blocked by the horizontal polarizing filter 1702 and may pass therethrough. Diagonal polarization vectors (e.g., inclined vectors with respect to the horizontal and the vertical axes) of the azimuthal CVB L17*b* may be decomposed into components in the horizontal axis and the vertical axis, and a vertical axis component of the polarization vector may be blocked by the horizontal polarizing filter 1702, while a horizontal axis component of the polarization vector may not be blocked by the horizontal polarizing filter 1702 and may pass therethrough. Thus, the azimuthal CVB L17*b* having azimuthal polarization may be modulated into the 8-shaped laser beam L17*b*' via the horizontal polarizing filter 1702. The 8-shaped laser beam L17*b*' modulated from the azimuthal CVB L17*b* may have the polarization vector including the horizontal axis component that is parallel with the polarization axis of the horizontal polarizing filter 1702, as illustrated in FIG. 17B. Referring to FIG. 17B, arrows illustrated inside the 8-shaped laser beam L17*b*' may denote intensities and polarization directions of the modulated 8-shaped laser beam L17*b*'. The arrows illustrated in the 8-shaped laser beam L17*b*' in FIG. 17B may be parallel with the polarization axis of the horizontal polarizing filter 1702 and may be longer in the vicinity of the vertical axis (that is, in the vicinity of about 90 degrees and about 270 degrees) than in an away place from the vertical axis, which indicates that the polarization vector of the modulated 8-shaped laser beam L17*b*' is parallel with the polarization axis of the horizontal polarizing filter 1702 and the intensity of the polarization vector is relatively high in the vicinity of the vertical axis (that is, in the vicinity of about 90 degrees and about 270 degrees) and is relatively low going away from the vertical axis.

Figure 18:
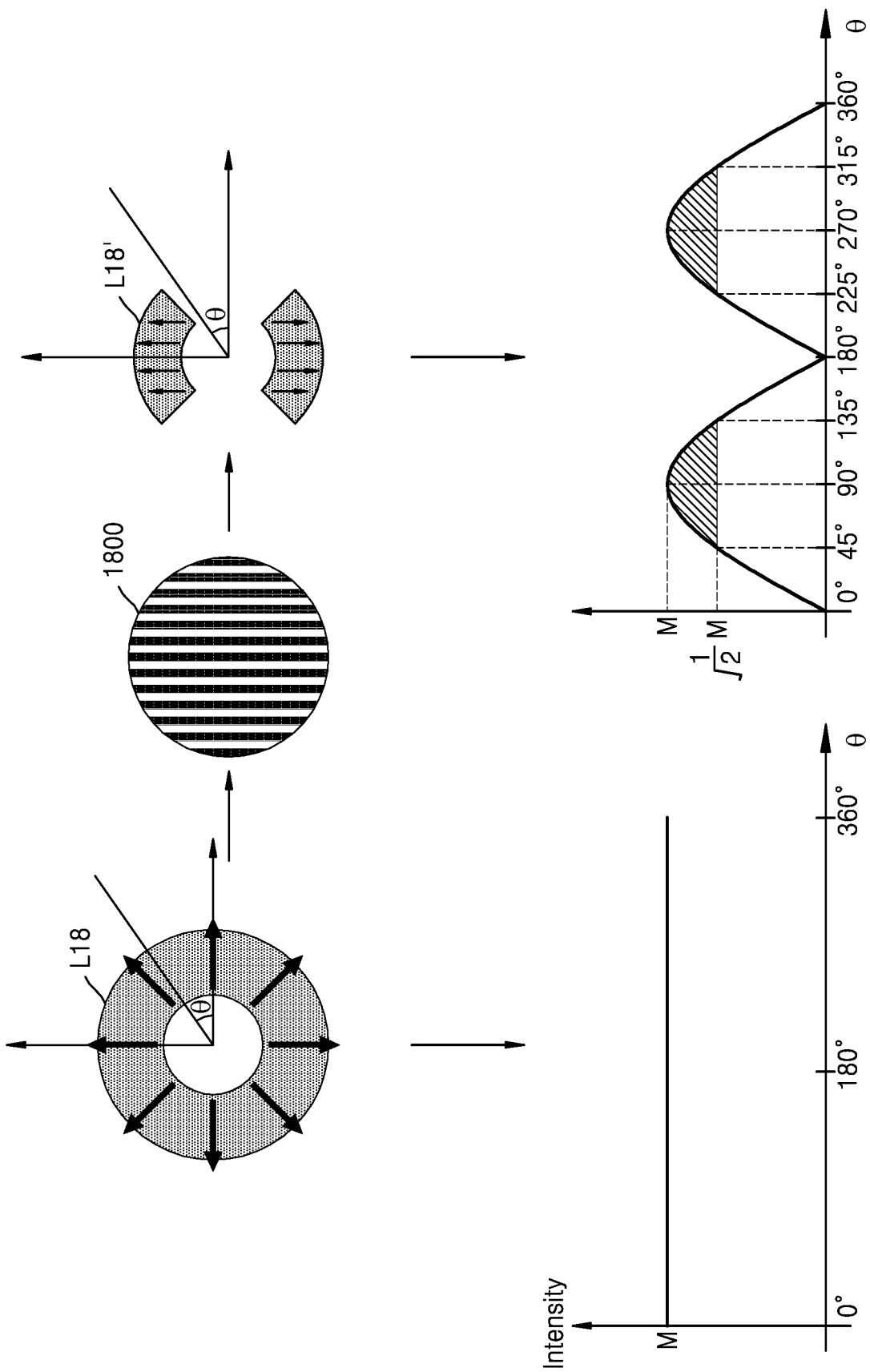
FIG. 18 illustrates graphs of angular intensity of a CVB and an 8-shaped beam according to an embodiment.

FIG. 18 illustrates graphs of angular intensity of a radial CVB L18 and an 8-shaped laser beam L18', according to an embodiment. Referring to FIG. 18, it may be understood that the radial CVB L18 modulated by a CVB modulation module is modulated into an 8-shaped laser beam L18' via a vertical polarizing filter 1800. The radial CVB L18 modulated by the CVB modulation module may have a constant intensity according to the rotation direction of the azimuth $\ominus$ (from about 0 degrees to 360 degrees). The radial CVB L18 having the constant intensity may be modulated into the 8-shaped laser beam L18' via the vertical polarizing filter 1800, and the intensity of the modulated 8-shaped laser beam L18' may have an absolute sine curve according to the rotation direction of the azimuth $\ominus$ (from about 0 degrees to 360 degrees). The intensity of the modulated 8-shaped laser beam L18' may be about 0 when the azimuth $\ominus$ is about 0 degrees and about 180 degrees and may have the maximum value M when the azimuth $\ominus$ is about 90 degrees and about 270 degrees.

In one graph illustrated in lower right side of FIG. 18, hatched portions of the intensity of the modulated 8-shaped laser beam L18' have a value equal to or greater than 1/SQRT(2) of the maximum value M and equal to or less than the maximum value M. The hatched portions may have the azimuth $\ominus$ of about 45 degrees to about 135 degrees and about 225 degrees to about 315 degrees. The intensity of the portions where the intensity is equal to or greater than 1/SQRT(2) of the maximum value M and equal to or less than the maximum value M may be the main intensity for the laser dicing of the substrate. The portions having the intensity equal to or greater than 1/SQRT(2) of the maximum value M and equal to or less than the maximum value M may be expressed in a shape of the 8-shaped laser beam L18' as illustrated in FIG. 18.

Description of the embodiment in FIG. 18 of the inventive concept may be equally applied to the case in which an azimuthal CVB modulated by the CVB modulation module is modulated by a horizontal polarizing filter into an 8-shaped laser beam, and the principle thereof may be substantially the same as the descriptions above.

With reference to FIGS. 6 through 18 and embodiments of the inventive concept, descriptions have been given for the cases in which circular Gaussian laser beams are modulated into 8-shaped laser beams via laser beam modulating units. With reference to FIGS. 6 through 9, various embodiments have been described in which the circular Gaussian laser beams are modulated into the 8-shaped laser beams without modulating the circular Gaussian laser beams into CVBs. With reference to FIGS. 10 through 15, various embodiments have been described in which the circular Gaussian laser beams are modulated into the CVBs. With reference to FIGS. 16 through 18, various embodiments have been described in which the CVBs modulated from the circular Gaussian laser beams are modulated into the 8-shaped laser beams.

Below, with reference to FIGS. 19 through 23, a laser dicing device including a laser beam modulating unit and a method of dicing a substrate by using the laser dicing device are described in detail.

Figure 19:
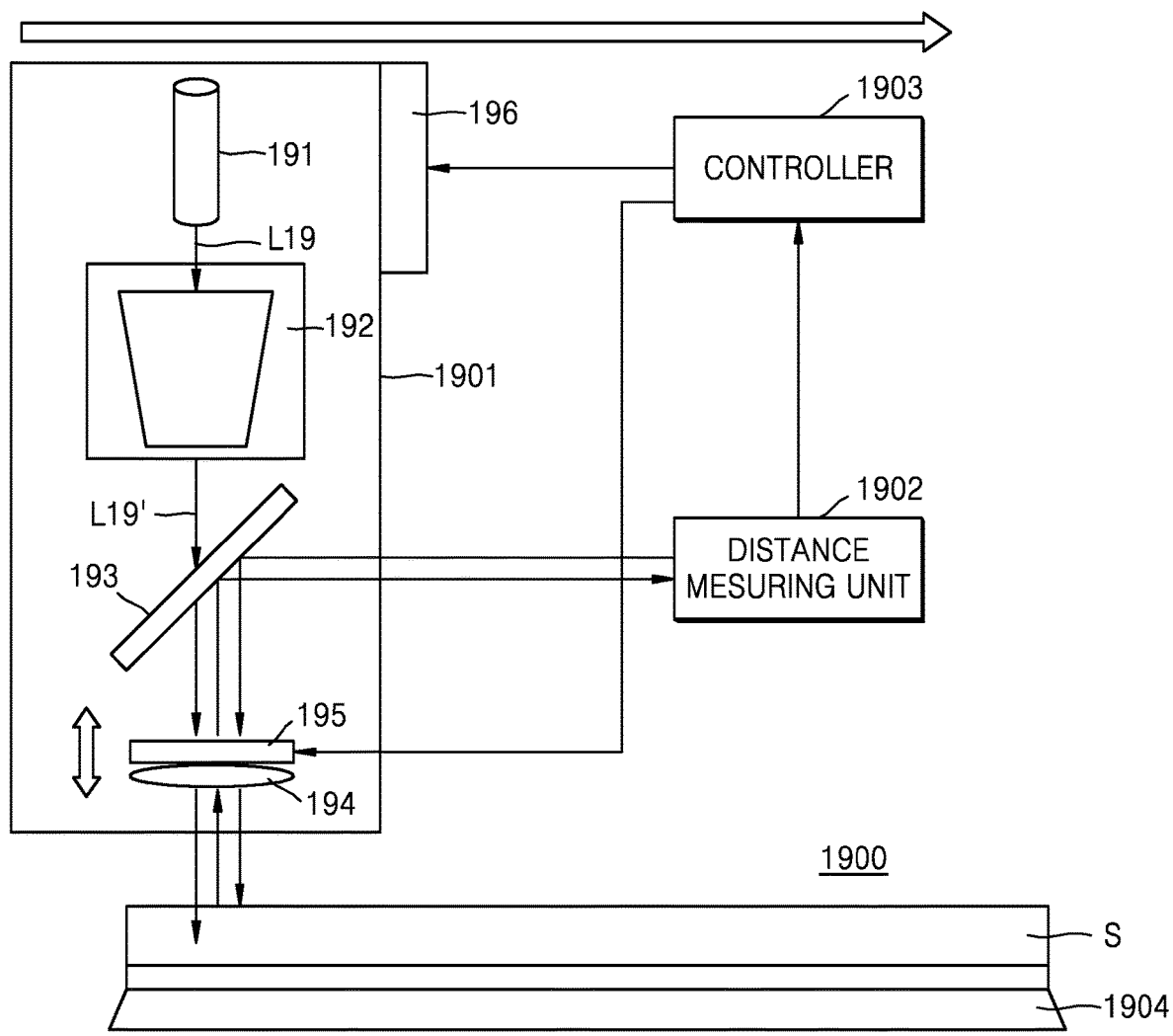
FIG. 19 is a schematic configuration diagram of a dicing process of a laser dicing device according to an embodiment.

FIG. 19 is a schematic configuration diagram of a dicing process of a laser dicing device 1900 according to an embodiment. Referring to FIG. 19, the laser dicing device 1900 may include a laser dicing processor 1901, a distance measurement unit 1902, and a substrate seating unit 1904. The laser dicing processor 1901 and the distance measurement unit 1902 of the laser dicing device 1900 may be connected to a controller 1903 controlling an operation of the laser dicing device 1900.

The laser dicing processor 1901 of the laser dicing device 1900 may include a laser beam emitter 191, a laser beam modulating unit 192, an optical transmission unit 193, a focusing lens unit 194, a focusing driver 195, and a position driver 196.

The laser beam emitter 191 may emit a laser processing beam L19 for forming modified regions and cracks in the substrate S. For example, the laser processing beam L19 emitted from the laser beam emitter 191 may be a Gaussian laser beam that has intensity of Gaussian distribution, a pulse width of about 1 µs or less, and a peak power density of about $1 \times 10^8$ (W/cm$^2$) at the beam-focusing point.

The laser beam modulating unit 192, the optical transmission unit 193, and the focusing lens unit 194 may be sequentially arranged on a path of the laser processing beam L19 emitted from the laser beam emitter 191.

The laser beam modulating unit 192 may, as described above with reference to FIGS. 6A through 18, modulate the Gaussian laser beam L19 emitted from the laser beam emitter 191 into a laser beam that has a beam intensity relatively reduced in the vicinity of the direction parallel with the laser dicing direction. According to an embodiment, the laser beam modulating unit 192 may modulate the emitted Gaussian laser beam L19 into an 8-shaped laser beam L19'.

A method of modulating the Gaussian laser light L19 of the laser beam modulating unit 192 into the 8-shaped laser beam L19' may be established by methods according to various embodiments of the inventive concept described above with reference to FIGS. 5 through 18.

The 8-shaped laser beam L19' modulated by the laser beam modulating unit 192 may reach the focusing lens unit 194 via the optical transmission unit 193. The optical transmission unit 193 may be a dichroic mirror. The dichroic mirror may be a reflector including many thin layers of materials having different refractive indexes and reflect light of a certain wavelength while transmitting light of a certain other wavelength. The optical transmission unit 193 may transmit the modulated 8-shaped laser beam L19' and transmit the modulated 8-shaped laser beam L19' to the focusing lens unit 194. For example, the optical transmission unit 193 may be an optical device transmitting the laser beam L19'. In addition, the optical transmission unit 193 may reflect a laser beam emitted from the distance measurement unit 1902 for measuring a distance, which is to be described later. For example, the focusing lens unit 194 may be or may include a focusing lens, e.g., a convex lens. In certain embodiments, the focusing lens 194 may include a combination of a convex lens and a concave lens.

The focusing lens unit 194 may focus the modulated 8-shaped laser beam L19' so that the modulated 8-shaped laser beam L19' is focused in the substrate S to form modified regions and cracks. The focusing driver 195 may be combined with the focusing lens unit 194 to control a position of the beam-focusing point of the modulated 8-shaped laser beam L19' focused by the focusing lens unit 194. The focusing driver 195 may operate according to a command signal of the controller 1903 which receives the distance between the substrate S and the focusing lens unit 194, measured by the distance measurement unit 1902, and may control the position of the focusing lens unit 194. Accordingly, in the substrate S having various thicknesses, modified regions and cracks may be formed by focusing the modified 8-shaped laser beam L19' in the vicinity of an effective height or depth of the substrate S for dicing the substrate S.

After the laser dicing processor 1901 forms one modified region and one crack in one region of the substrate S, the position driver 196 may move the laser dicing processor 1901 in a direction of the dicing line according to a control command of the controller 1903.

In certain embodiments, the position driver 196 may be combined with the substrate seating unit 1904 instead of being combined with the laser dicing processor 1901 as shown in FIG. 19. In this case, the position driver 196 may move the substrate seating unit 1904, thus the substrate S, in the direction of the dicing line according to the control command of the controller 1903. For example, the substrate seating unit 1904 may be or may include a substrate support on which the substrate S is disposed/seated.

Thus, a relative position between the substrate S and the laser dicing processor 1901 may be adjusted by combining the position driver 196 with the laser dicing processor 1901 or the substrate seating unit 1904.

The 8-shaped laser beam L19' focused on the substrate S mounted on the substrate seating unit 1904 via the laser dicing processor 1901 may be arranged such that side portions of the 8-shaped form where there is no laser beam or the intensity of the laser beam is relatively low are aligned with a dicing line formed on the substrate S, and top and bottom portions of the 8-shaped form where the intensity of the laser beam is relatively high are aligned away from the dicing line. Thus, the 8-shaped laser beam L19', which is incident on the substrate S and relatively moves in the dicing direction, does not overlap the modified regions and cracks, which are pre-formed, and thus, may not be scattered in the substrate S. Therefore, semiconductor elements formed on a substrate may not be damaged by a laser beam scattering.

Figure 20:
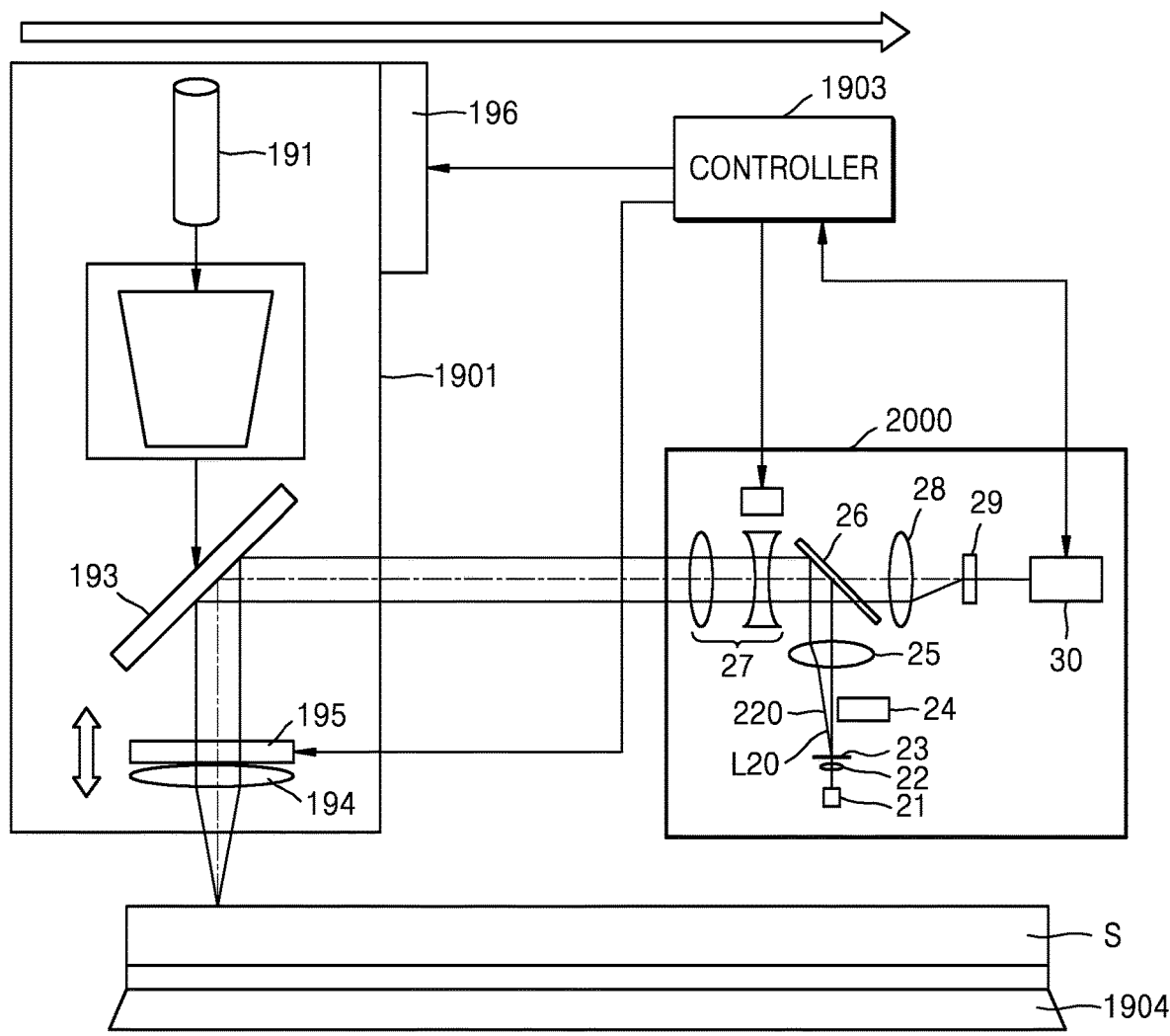
FIG. 20 is a schematic configuration diagram of a distance measurement of a laser dicing device according to an embodiment.

FIG. 20 is a schematic configuration diagram of a distance measurement of a laser dicing device according to an embodiment. A distance measurement unit 2000 may include a distance measurement laser beam emitter 21, a focusing lens 22, a pinhole 23, a knife edge 24, an illumination system lens 25, a half mirror 26, focusing lenses 27, an image-forming lens 28, a detector 29, and a signal processor 30.

Referring to FIG. 20, the distance measurement laser beam L20 emitted from the distance measurement laser beam emitter 21 may pass through the focusing lens 22 and the pinhole 23, and a portion of the distance measurement laser beam L20 may be blocked by the knife edge 24. The distance measurement laser beam L20 that is not blocked by the knife edge 24 may pass through the illumination system lens 25, be reflected by the half mirror 26, intervene the focusing lenses 27, and be transmitted to the optical transmission unit 193. The optical transmission unit 193 may be a dichroic mirror. The dichroic mirror may be a reflector including many thin layers of materials having different refractive indexes and reflect light of a certain wavelength while transmitting light of a certain other wavelength. The dichroic mirror may reflect the distance measurement laser beam L20. The reflected distance measurement laser beam L20 may travel along a shared optical path of the laser processing beam, be focused by the focusing lens unit 194, and be irradiated on the substrate S. A reflected laser beam of the distance measurement laser beam L20 irradiated on the substrate S may travel back to the focusing lens unit 194 along the shared optical path, be reflected by the optical transmission unit 193, sequentially pass through the focusing lenses 27 and the half mirror 26, be focused by the image-forming lens 28, and be irradiated on the detector 29. The detector 29 may transmit an output signal according to a detected intensity of the distance measurement laser beam L20 to the signal processor 30. The controller 1903 receiving the output signal may adjust a position of the focusing lenses 27 via a position driver (not shown) to adjust the beam-focusing point of the distance measurement laser beam L20.

The controller 1903 receiving the output signal from the distance measuring unit 2000 may transmit a signal to the position driver 196 and/or to the focusing driver 195 to adjust the position of the focusing lens unit 194, and may control the laser processing beam to be focused at a certain depth inside the substrate S.

The modified regions and the cracks may be continuously formed along the dicing line of the substrate S via the laser dicing processor 1901, the distance measurement unit 2000, and the controller 1903.

Figure 21:
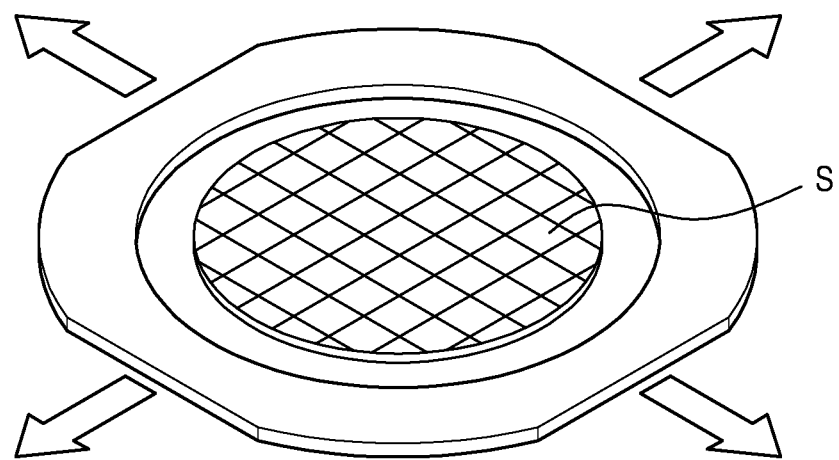
FIG. 21 is a diagram of dicing a substrate into individual semiconductor substrates by using an external force, according to an embodiment.

As illustrated in FIG. 21, after continuous forming of the modified regions and the cracks are completed along the dicing line in the substrate S, an external force may be applied to the substrate S to expand the cracks therein, and the substrate S may be diced into individual semiconductor substrates.

Figure 22:
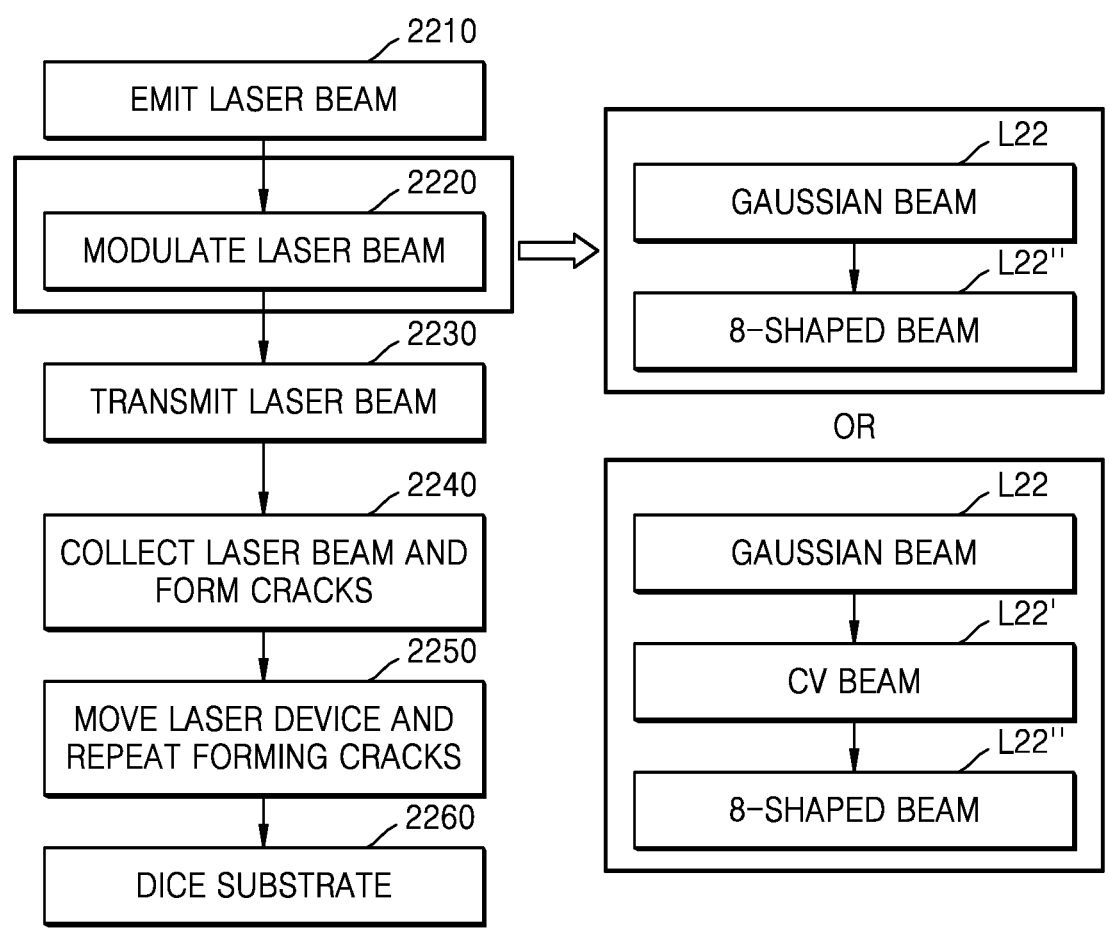
FIG. 22 illustrates a flowchart of a method of dicing a substrate and a method of laser beam modulation, according to an embodiment.
Figure 23:
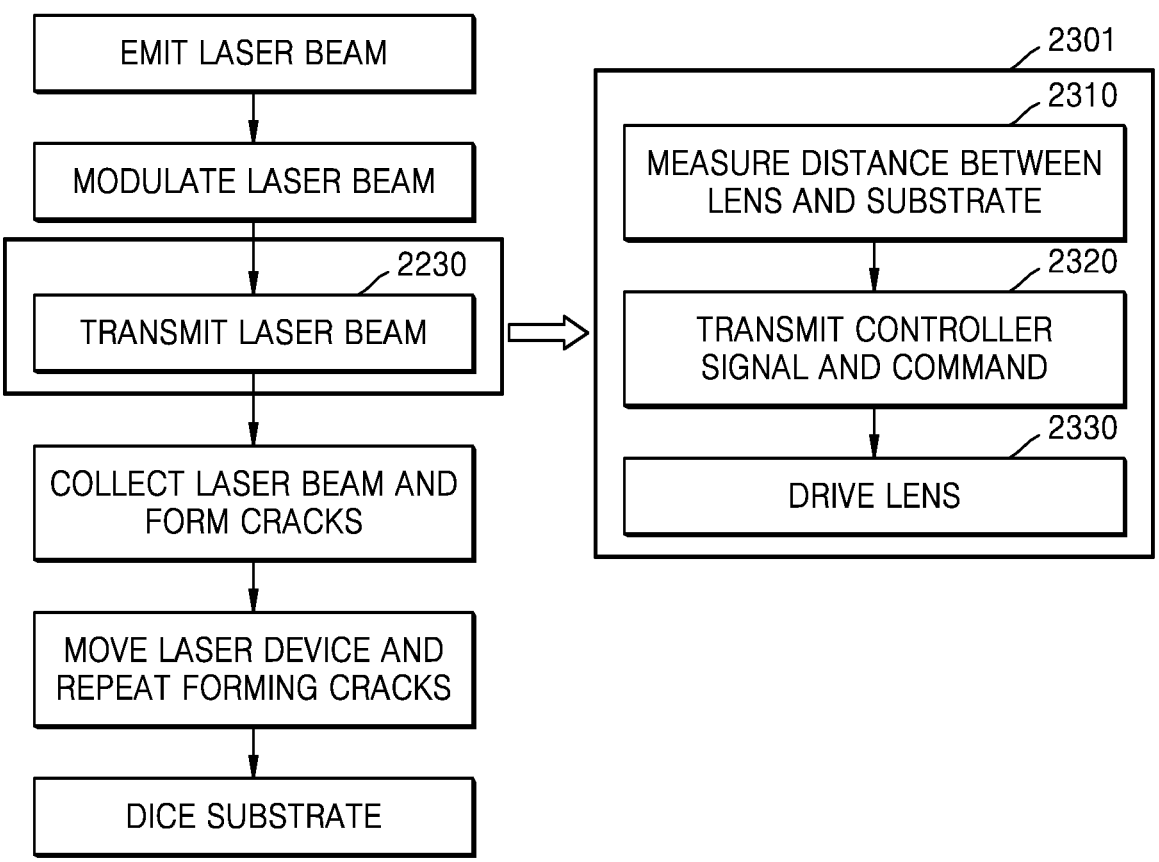
FIG. 23 illustrates a flowchart of a method of dicing a substrate and a distance measurement according to an embodiment.

FIGS. 22 and 23 are flowcharts of methods of dicing the substrate S according to some embodiments. Referring to FIG. 22, in a method of dicing a semiconductor substrate by using a laser dicing device, an embodiment of the inventive concept may include a laser beam emission operation in which a laser beam is emitted (S2210). In the laser beam emission operation, a laser processing beam may be emitted to form modified regions and cracks inside the substrate S (S2210). For example, the laser processing beam emitted in the laser emission operation S2210 may be a Gaussian laser beam that has intensity of Gaussian distribution, a pulse width of about 1 μs or less, and a peak power density of about $1\times10^8$ (W/cm$^2$) at the beam-focusing point.

The laser processing beam emitted in the laser emission operation S2210 may sequentially pass through a laser modulation operation S2220, a laser transmission operation S2230, and a laser focusing operation S2240.

As described above in embodiments of FIGS. 5 through 18, in the laser modulation operation S2220, a shape of a Gaussian laser beam L22 emitted in the laser emission operation S2210 may be modulated by relatively reducing intensity in the vicinity of the direction parallel with the laser dicing direction of the Gaussian laser beam L22. According to an embodiment, the laser modulation operation S2220 may modulate the Gaussian laser beam L22 into an 8-shaped laser beam L22".

In the laser modulation operation S2220, unlike embodiments described with reference to FIGS. 5 through 8, the processing Gaussian laser beam L22 may be modulated into the 8-shaped laser beam L22", without being modulated into a high dimensional CVB.

Alternatively, in the laser modulation operation S2220, like embodiments described with reference to FIGS. 11 through 18, the processing Gaussian laser beam L22 may be modulated into a high dimensional CVB L22', and then, the high dimensional CVB L22' may be modulated into the 8-shaped laser beam L22".

The modulated 8-shaped laser beam L22" may be transmitted through optical components in the laser transmission operation S2230, and in the laser transmission operation S2230, at least one lens and/or one mirror may be included in the optical components. In one embodiment, the dichroic mirror may be used in the laser transmission operation S2230. The modulated 8-shaped laser beam L22" transmitted through the optical components in the laser transmission operation S2230 may be focused in the laser focusing operation S2240.

The transmitted modulated 8-shaped laser beam L22" may be focused inside the substrate S in the laser focusing operation S2240. A focusing lens may be used in the laser focusing operation S2240. In the laser focusing operation S2240, modified regions and cracks may be formed by using the focusing lens and focusing the processing 8-shaped laser beam L22" into the substrate S. A driving operation (not shown) may be added to control a position of the beam-focusing point of the modulated 8-shaped laser beam L22" focused in the laser focusing operation S2240. In the driving operation (not shown), the position of the focusing lens in the laser focusing operation S2240 may be controlled by a command signal of the controller 1903 receiving a signal in a distance measurement operation to be described later.

When forming the modified regions and the cracks in one region of the substrate S is completed, in the driving operation (not shown), the laser dicing processor 1901 or the substrate seating unit 1904 of the laser dicing device 1900 may be relatively moved in a dicing line direction by the control command generated from the controller 1903. For example, the substrate seating unit 1904 and the laser dicing process may move with respect to each other in the driving operation. Therefore, a continuous forming of modified regions and cracks inside the substrate S may be performed. At this time, since the laser beam collected inside the substrate S does not spatially overlap the preformed modified regions and cracks due to the 8-shaped form thereof, the laser beam may not be scattered inside the substrate S, and thus, the substrate S may not be damaged.

The modified regions and the cracks may be continuously formed on the substrate S through the laser emission operation S2210, the laser modification operation S2220, the laser transmission operation S2230, the laser focusing operation S2240, and a moving operation of the laser dicing device S2250. Then, the cracks may be expanded by applying an external force to the substrate so that the substrate S is diced into individual semiconductor chips (S2260), which completes the dicing of the substrates S.

Referring to FIG. 23, the laser transmission operation S2230 may further include a distance measurement operation S2301. The distance measurement operation S2301 may include an operation of measuring a distance between the focusing lenses 27 and the substrate S (S2310), an operation of transmitting a command signal to the driving unit after a signal of the measured distance is transmitted to the controller 1903 (S2320), and an operation of driving the focusing lenses 27 and the focusing lens unit 194 by the driving unit receiving the command signal (S2330). The principle and the method of operations of the distance measurement operation S2301 may be the same as those of the embodiment disclosed in FIG. 20.

According to an embodiment of the present disclosure, a method of manufacturing a semiconductor device may include a laser dicing method described with respect to FIGS. 22 and 23 above. For example, the substrate S may be formed with semiconductor devices and circuits on the substrate S before the substrate S is subject to the dicing process. For example, a plurality of insulation layers and a plurality of conductive layers may be formed on the substrate S with a plurality of photolithography processes before the substrate S is subject to the dicing process. The substrate S may be divided into a plurality of semiconductor chips by the dicing process. After the dicing process, each of the plurality of semiconductor chips may be packaged to form a semiconductor device.

As described above, embodiments have been disclosed in the drawings and the specification. While the embodiments have been described herein with reference to specific terms, it should be understood that they have been used only for the purpose of describing the technical idea of the inventive concept and not for limiting the scope of the inventive concept as defined in the claims. Therefore, one with ordinary skill in the art will appreciate that various modifications and equivalent embodiments are possible without departing from the scope of the inventive concept. Therefore, the scope of protection of the invention should be determined by the appended claims.

What is claimed is:

1. A method of laser beam modulation, the method comprising:
   emitting a Gaussian laser beam; and
   modulating a shape of the emitted Gaussian laser beam by reducing intensity of the Gaussian laser beam in a region surrounding a first line passing through a center of the Gaussian laser beam in a plan view,
   wherein the first line is parallel with a laser dicing direction of the emitted Gaussian laser beam, and
   wherein the modulating of the Gaussian laser beam comprises:
      splitting the emitted Gaussian laser beam through birefringence;
      removing a central portion of the split Gaussian laser beam using a first slit; and removing side portions of the Gaussian laser beam using a second slit different from the first slit after removing the central portion of the split Gaussian laser beam.

2. The method of claim 1, wherein the modulating of the Gaussian laser beam comprises modulating the Gaussian laser beam into an 8-shaped laser beam.

3. The method of claim 2, wherein the modulating of the Gaussian laser beam comprises modulating the Gaussian laser beam into the 8-shaped laser beam by using a spatial light modulator (SLM).

4. The method of claim 2, wherein the modulating of the Gaussian laser beam comprises:
modulating the emitted Gaussian laser beam into a cylindrical vector beam (CVB); and
modulating the CVB into an 8-shaped laser beam.

5. The method of claim 4, wherein the modulating of the Gaussian laser beam into the CVB is performed by using at least one of a spiral element, a plurality of spatial laser beam modulators, a fiber-optic polarization controller, and a spatially segmented half-wavelength plate.

6. A method of laser beam modulation, the method comprising:
emitting a Gaussian laser beam; and
modulating a shape of the emitted Gaussian laser beam by reducing intensity of the Gaussian laser beam in a region surrounding a first line passing through a center of the Gaussian laser beam in a plan view,
wherein the first line is parallel with a laser dicing direction of the emitted Gaussian laser beam,
wherein the modulating of the Gaussian laser beam comprises modulating the Gaussian laser beam into an 8-shaped laser beam,
wherein the modulating of the Gaussian laser beam comprises:
modulating the emitted Gaussian laser beam into a cylindrical vector beam (CVB); and
modulating the CVB into an 8-shaped laser beam,
wherein the modulating of the Gaussian laser beam into the CVB is performed by using at least one of a spiral element, a plurality of spatial laser beam modulators, a fiber-optic polarization controller, and a spatially segmented half-wavelength plate,
wherein the modulating of the CVB into the 8-shaped laser beam is performed by using a polarizing filter, and
wherein the polarizing filter is a vertical polarizing filter passing vertical vector component of the CVB and blocking horizontal vector component of the CVB.

7. The method of claim 6, wherein the CVB has radial polarization.

8. The method of claim 6, wherein the CVB has azimuthal polarization.

9. A method of laser beam modulation, the method comprising:
emitting a Gaussian laser beam; and
modulating a shape of the emitted Gaussian laser beam by reducing intensity of the Gaussian laser beam in a region surrounding a first line passing through a center of the Gaussian laser beam in a plan view,
wherein the first line is parallel with a laser dicing direction of the emitted Gaussian laser beam,
wherein the modulating of the Gaussian laser beam comprises modulating the Gaussian laser beam into an 8-shaped laser beam,
wherein the modulating of the Gaussian laser beam comprises:
modulating the emitted Gaussian laser beam into a cylindrical vector beam (CVB); and
modulating the CVB into an 8-shaped laser beam,
wherein the modulating of the Gaussian laser beam into the CVB is performed by using at least one of a spiral element, a plurality of spatial laser beam modulators, a fiber-optic polarization controller, and a spatially segmented half-wavelength plate,
wherein the modulating of the CVB into the 8-shaped laser beam is performed by using a polarizing filter, and
wherein the polarizing filter is a horizontal polarizing filter passing horizontal vector component of the CVB and blocking vertical vector component of the CVB.

\* \* \* \* \*